(12) United States Patent
Ketzef

(10) Patent No.: US 12,159,314 B2
(45) Date of Patent: Dec. 3, 2024

(54) AUTOMATED REIMBURSEMENT INTERACTIONS

(71) Applicant: PASSPORTCARD LABS LTD., Netanya (IL)

(72) Inventor: Alon Ketzef, Bnei Dror (IL)

(73) Assignee: PASSPORT CARD LABS LTD, Netanya (IL)

( * ) Notice: Subject to any disclaimer, the term of this patent is extended or adjusted under 35 U.S.C. 154(b) by 131 days.

(21) Appl. No.: 16/051,542

(22) Filed: Aug. 1, 2018

(65) Prior Publication Data

US 2019/0035030 A1     Jan. 31, 2019

Related U.S. Application Data

(63) Continuation of application No. 13/900,919, filed on May 23, 2013, now abandoned, which is a
(Continued)

(51) Int. Cl.
    *G06Q 40/00*      (2023.01)
    *G06Q 40/08*      (2012.01)

(52) U.S. Cl.
    CPC .................. *G06Q 40/08* (2013.01)

(58) Field of Classification Search
    CPC ..................................................... G06Q 40/08
(Continued)

(56) References Cited

U.S. PATENT DOCUMENTS 8,606,512 B1 * 12/2013 Bogovich ............... H04W 4/40
                                                           701/410
9,286,266 B1 * 3/2016 Fleck ...................... G06Q 40/10
(Continued)

FOREIGN PATENT DOCUMENTS

CA      2787655 A1 * 2/2013 ............. G06Q 30/02

OTHER PUBLICATIONS

Boulos et al; "How smartphones are changing the face of mobile and participatory healthcare: an overview, with example from eCAALYX", Boulos et al. BioMedical Engineering OnLine 2011 (Year: 2011).*

*Primary Examiner* — Edward J Baird
(74) *Attorney, Agent, or Firm* — AlphaPatent Associates Ltd.; Daniel J. Swirsky

(57) ABSTRACT

A computerized reimbursement system including at least one reimbursement-enabled mobile communicator having computerized memory functionality, computerized communications functionality and wireless payment functionality and at least one reimbursement-enabled computer server having computerized memory functionality and computerized communications functionality, at least one of the at least one reimbursement-enabled mobile communicator and the at least one reimbursement-enabled computer server storing reimbursement policy parameters which are selectable by a reimbursing party using the system, the reimbursement policy parameters including at least payee location and transaction amount, at least one of the at least one mobile communicator and the at least one computer server being operative to automatically complete payment transactions which are compliant with the reimbursement policy parameters and to automatically reject payment transactions which are not compliant with the reimbursement policy parameters.

10 Claims, 33 Drawing Sheets

Related U.S. Application Data continuation-in-part of application No. 12/949,367, filed on Nov. 18, 2010, now abandoned.

(58) Field of Classification Search
USPC .................................................. 705/4, 35–40
See application file for complete search history.

(56) References Cited

U.S. PATENT DOCUMENTS

| | | | | |
|---|---|---|---|---|
| 9,760,871 B1* | 9/2017 | Pourfallah | ............. | G06Q 10/10 |
| 2005/0010446 A1* | 1/2005 | Lash | ...................... | G06Q 10/10 |
| | | | | 705/2 |
| 2005/0039014 A1* | 2/2005 | Sajkowsky | ............. | G07C 9/28 |
| | | | | 713/172 |
| 2007/0088580 A1* | 4/2007 | Richards, Jr. | .......... | G06Q 40/08 |
| | | | | 705/4 |
| 2010/0145737 A1* | 6/2010 | Joao | ....................... | G06Q 20/10 |
| | | | | 705/4 |
| 2010/0198608 A1* | 8/2010 | Kaboff | ................... | G16H 40/67 |
| | | | | 715/741 |
| 2010/0287008 A1* | 11/2010 | Roark | ................ | G06Q 30/0214 |
| | | | | 705/4 |
| 2010/0332252 A1* | 12/2010 | Beraja | .................... | G06Q 40/08 |
| | | | | 705/2 |
| 2011/0046985 A1* | 2/2011 | Raheman | ............... | G06Q 40/08 |
| | | | | 705/4 |
| 2013/0166322 A1* | 6/2013 | Woods | ................... | G06Q 40/08 |
| | | | | 705/3 |
| 2013/0297353 A1* | 11/2013 | Strange | ............. | G06K 9/00449 |
| | | | | 705/4 |
| 2014/0156448 A1* | 6/2014 | Grigg | ................ | G06Q 30/0631 |
| | | | | 705/26.7 |

\* cited by examiner

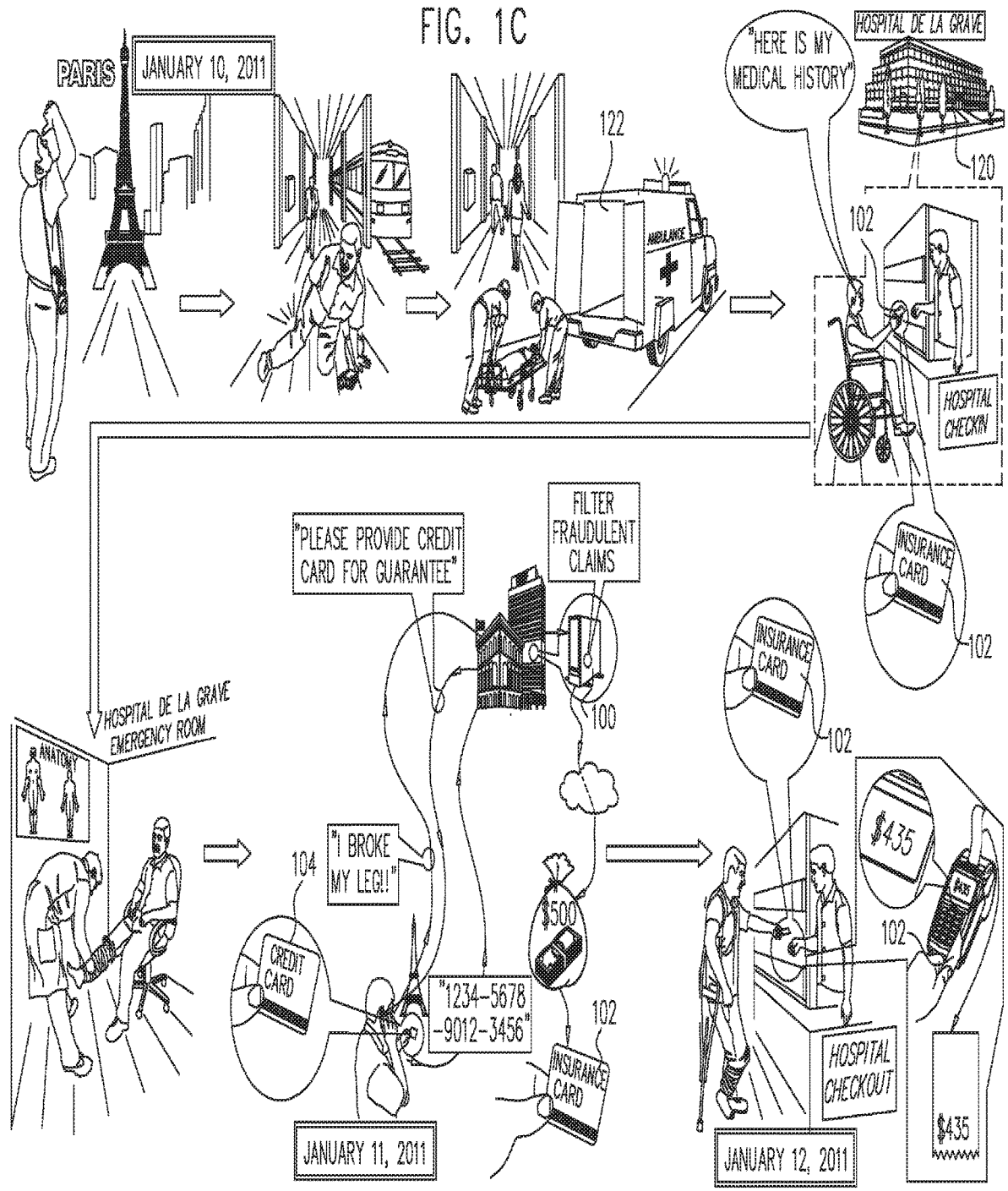

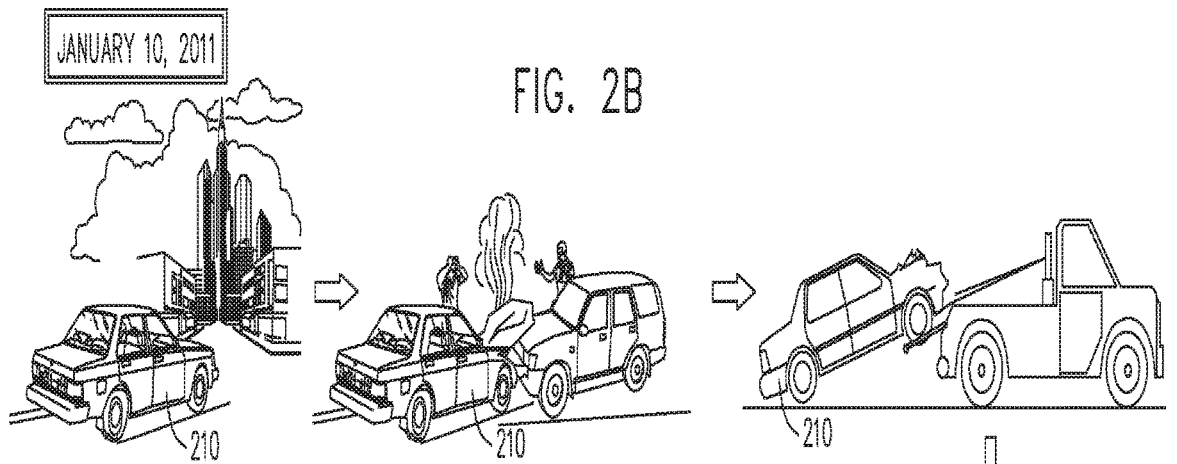
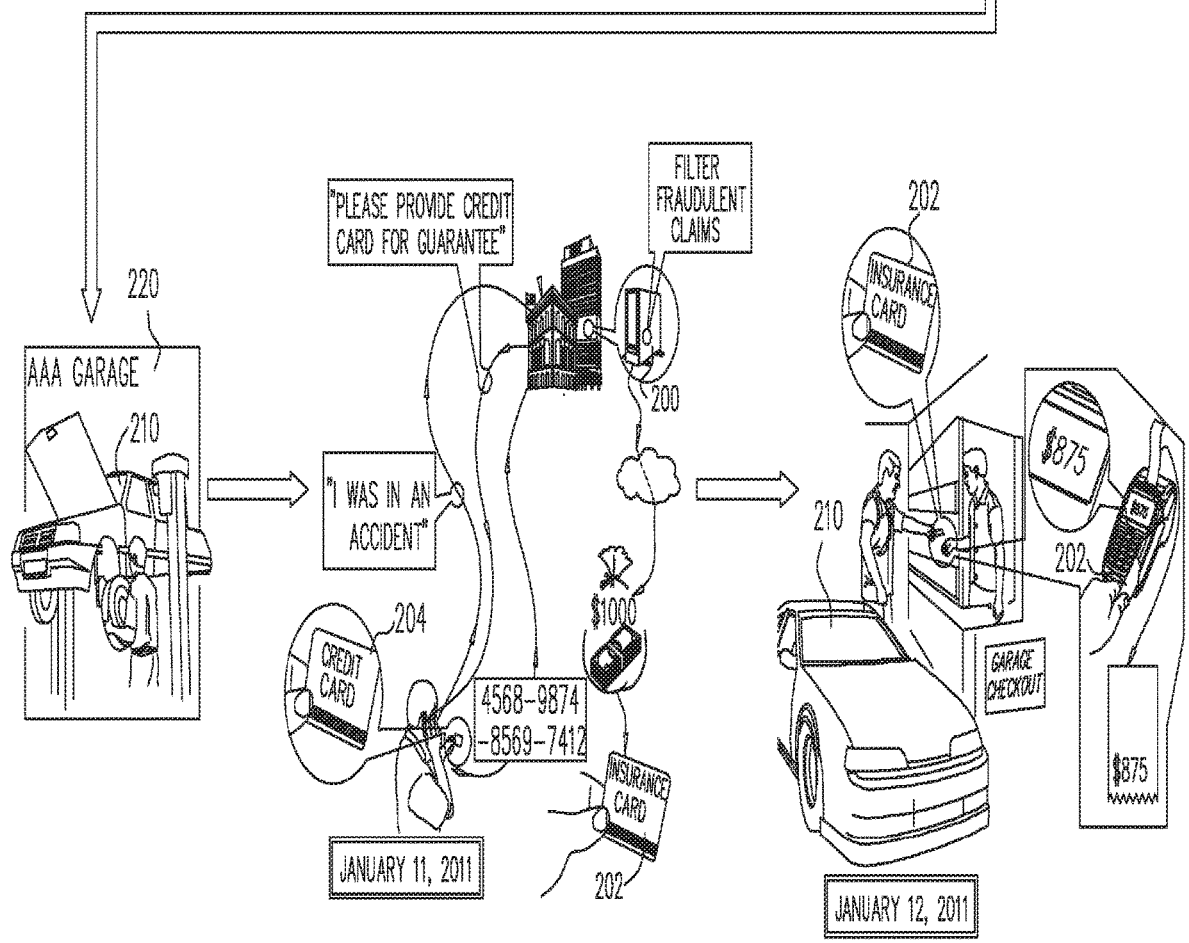
FIG. 2B

FIG. 2D
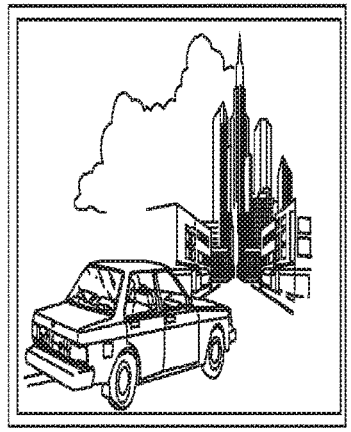
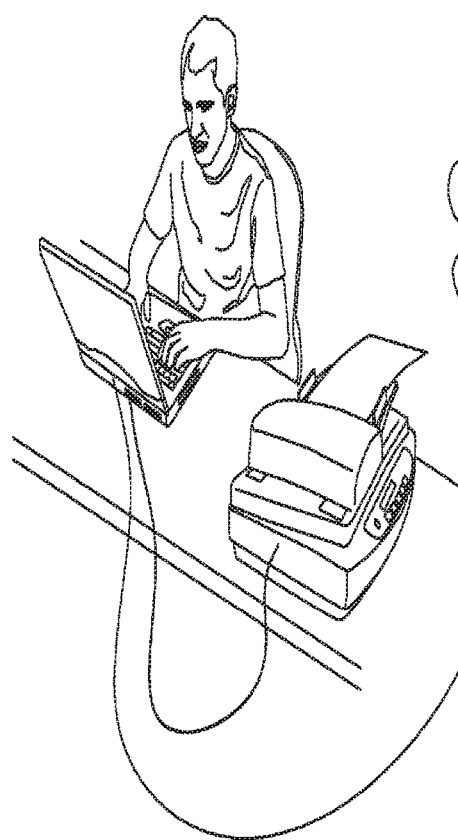
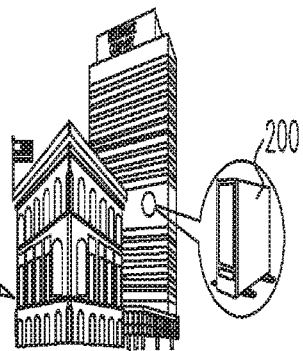
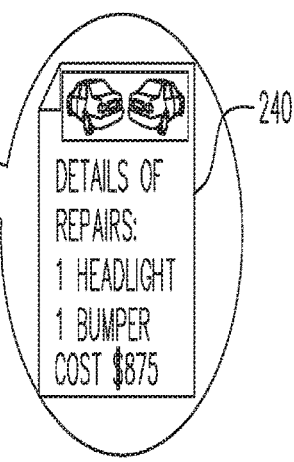

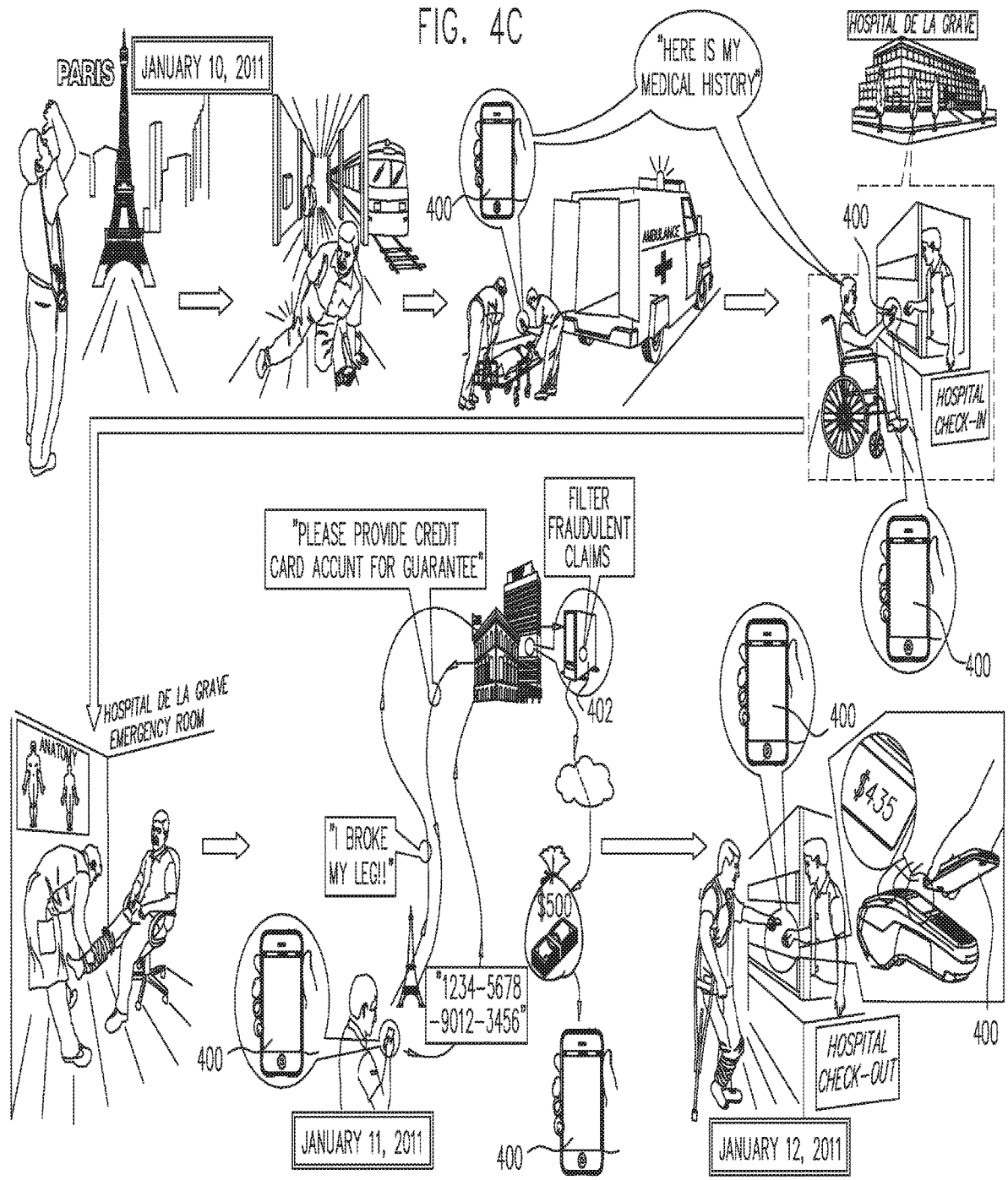

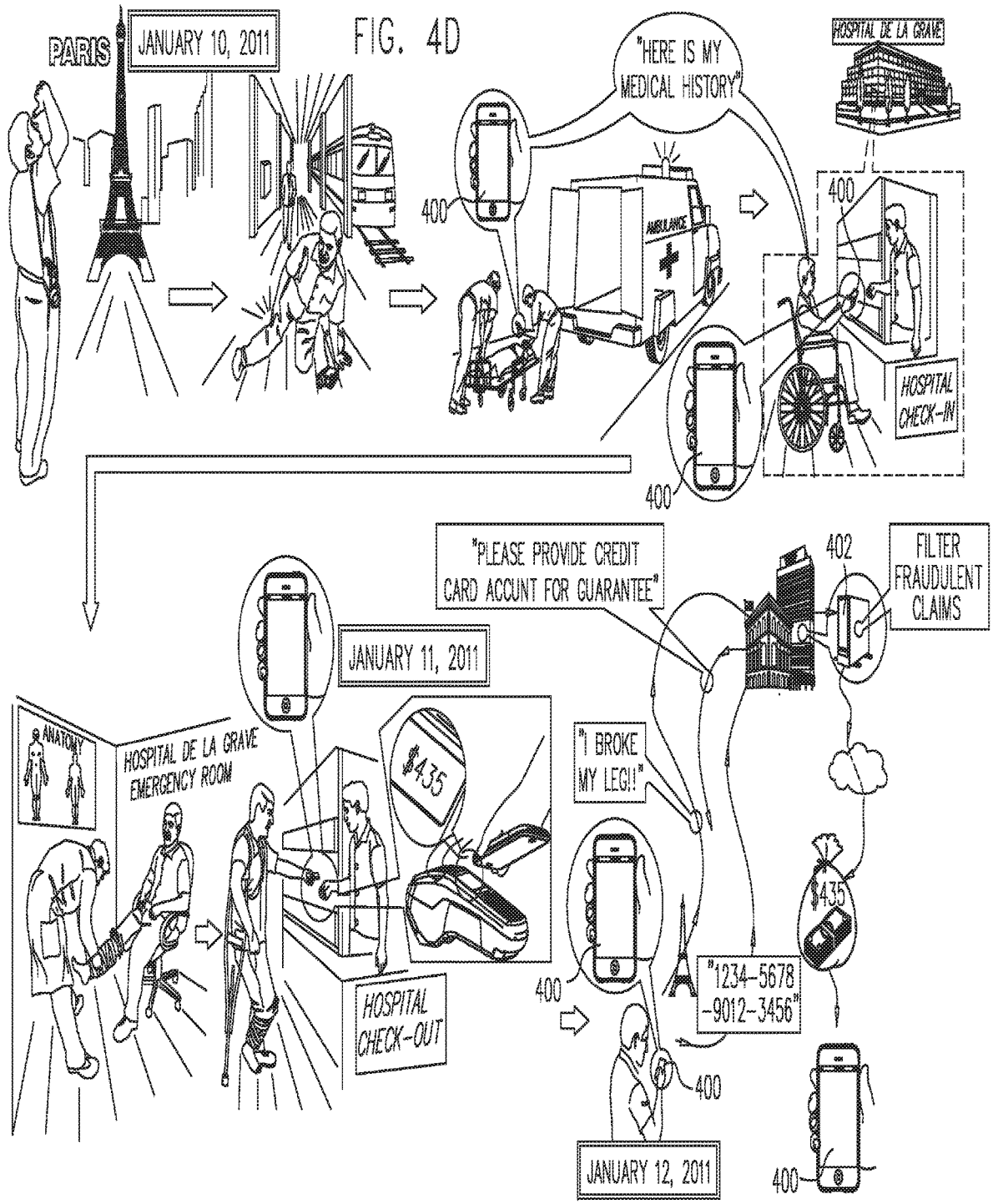

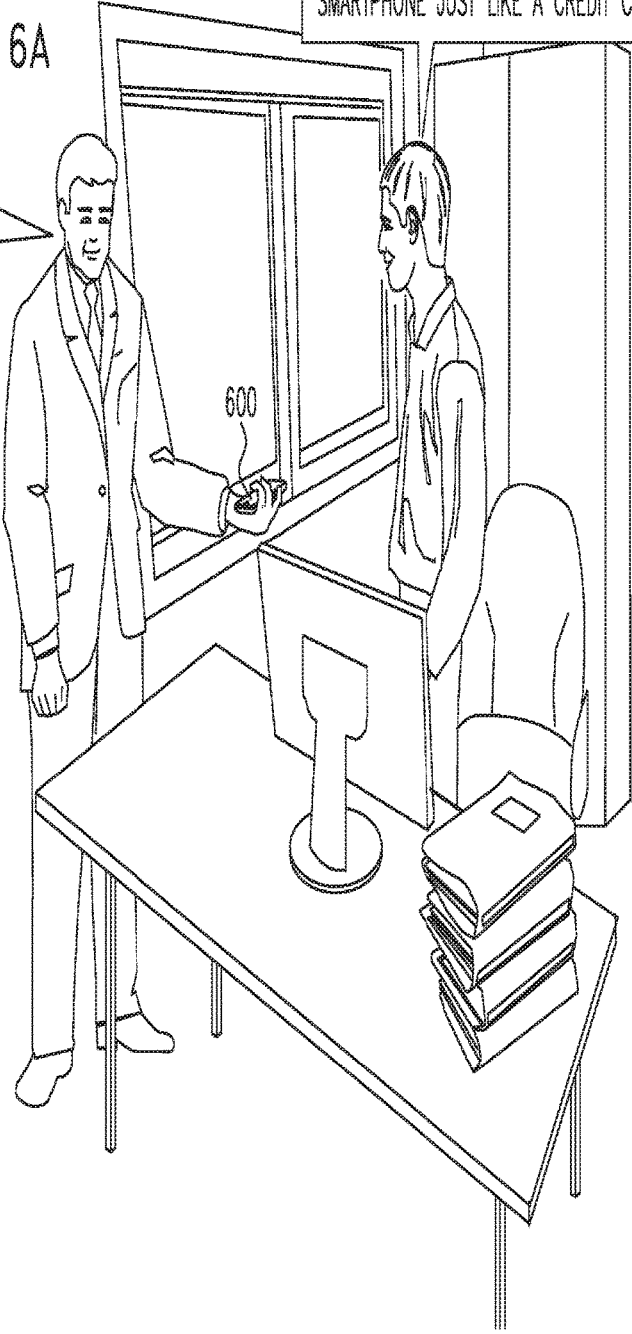

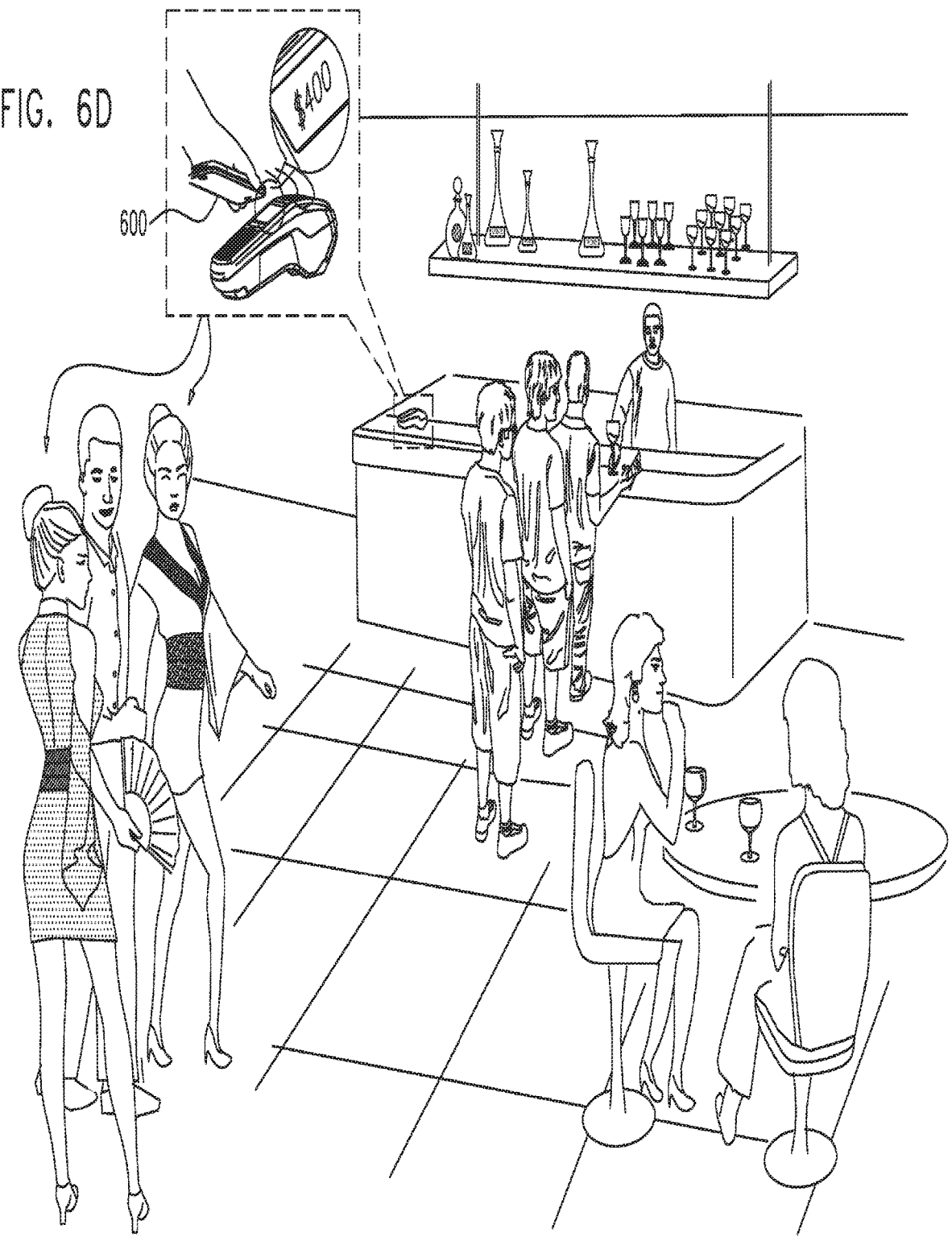

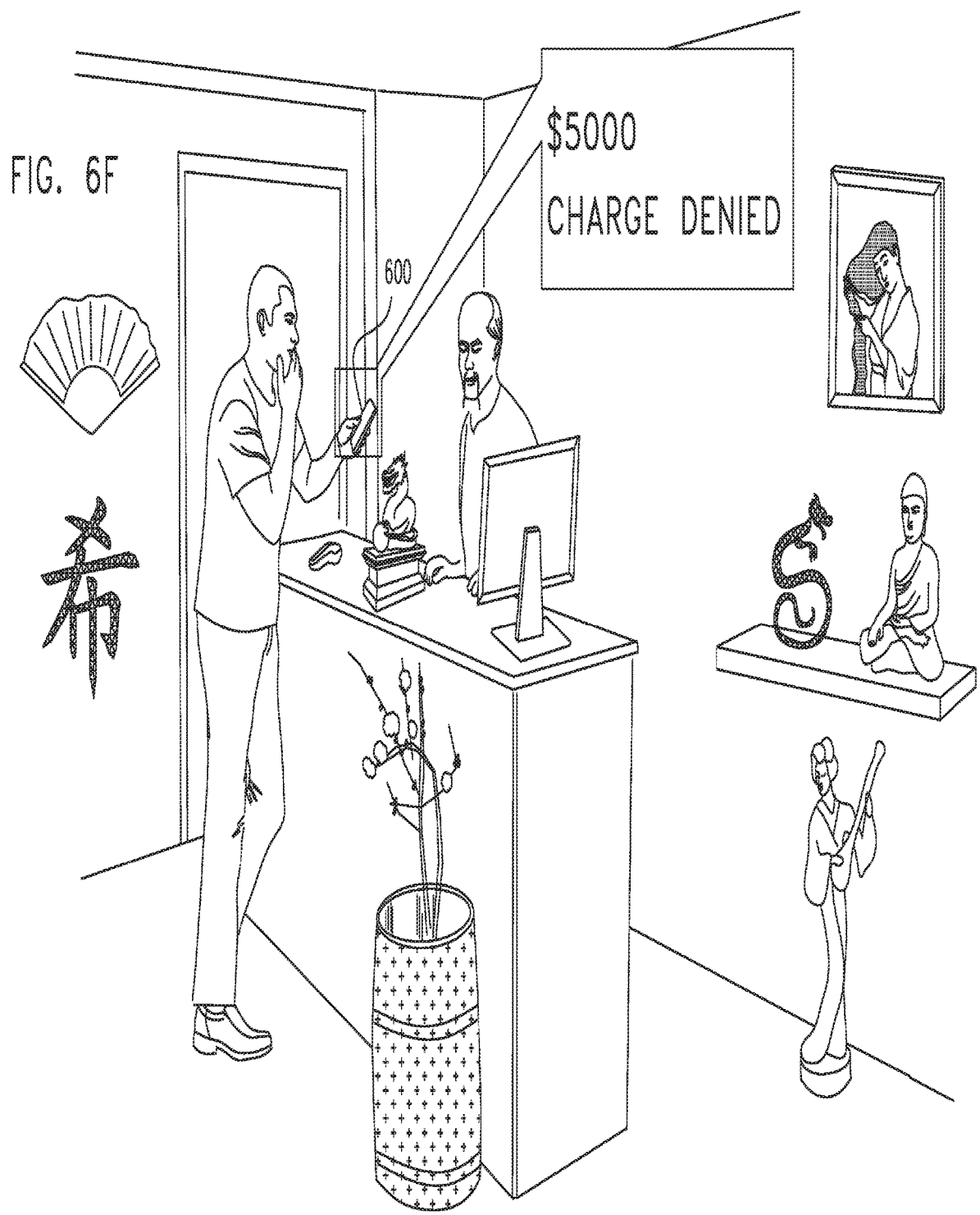

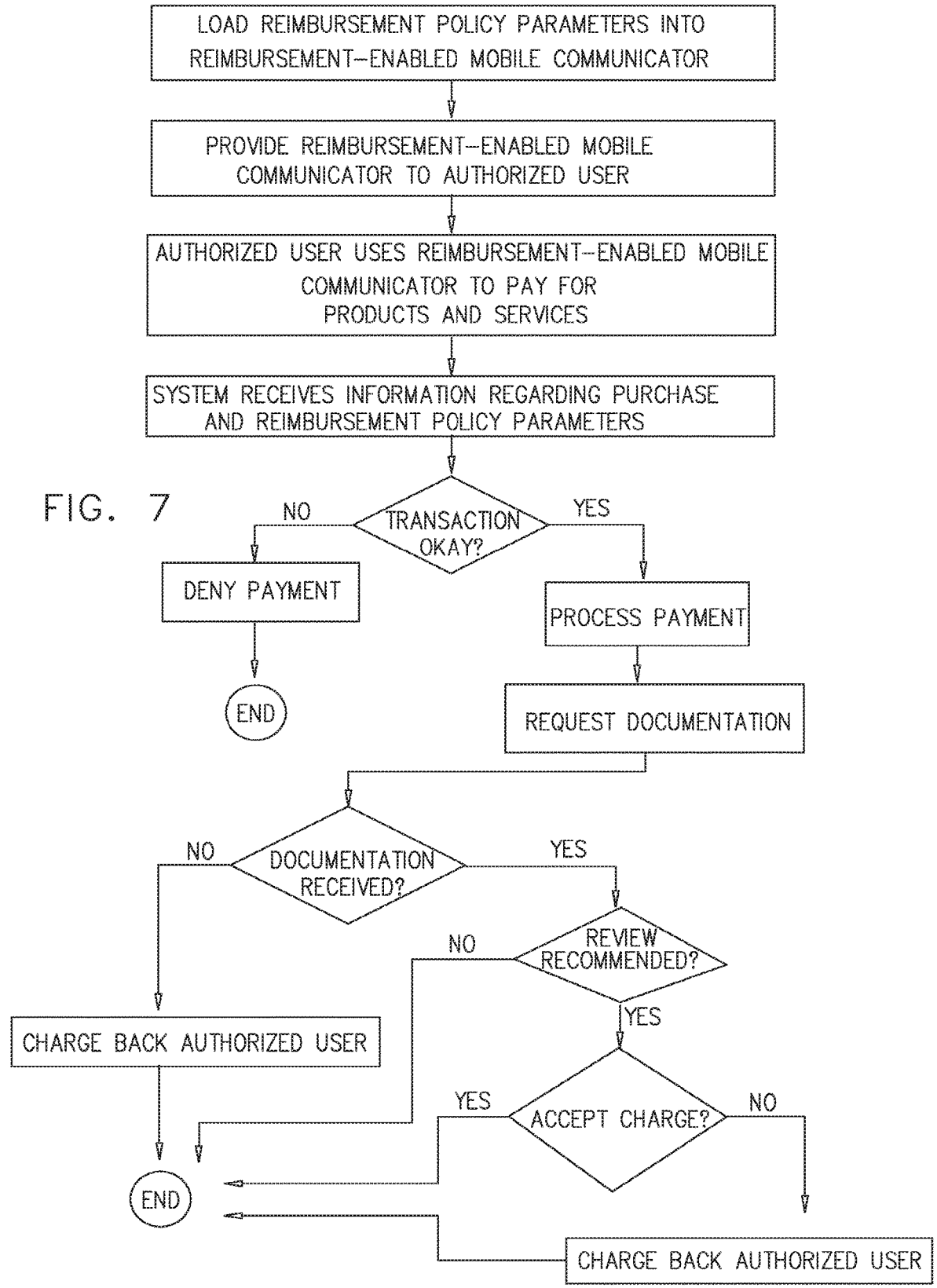

AUTOMATED REIMBURSEMENT INTERACTIONS

REFERENCE TO RELATED APPLICATIONS

The present application is a continuation-in-part of U.S. patent application Ser. No. 12/949,367, filed Nov. 18, 2010 and entitled AUTOMATED INSURER INSURED INTERACTIONS, the disclosure of which is hereby incorporated by reference.

FIELD OF THE INVENTION

The present invention relates to systems and methodologies for automated reimbursement interactions.

BACKGROUND OF THE INVENTION

The following publications are believed to represent the current state of the art:

MPP Power Text2Insure Text Messaging Travel Insurance Service, MPP Global Solutions, dated Sep. 24, 2010;

U.S. Pat. Nos. 4,491,725; 4,858,121; 5,235,507; 5,359,509; 6,208,973; 6,343,310; 6,609,200; 6,823,075; 6,941,363; 7,028,012; 7,039,603; 7,236,950; 7,287,071; 7,380,707; 7,434,729; 7,584,125; 7,590,557; 7,698,182; 7,792,686 and 8,066,192;

U.S. Published Patent Application Nos.: 2002/0035529; 2003/0088441; 2003/0187695; 2004/0083123; 2004/0148204; 2005/0015280; 2005/0086075; 2005/0122953; 2005/0228700; 2006/0106650; 2007/0005402; 2007/0129972; 2007/0168234; 2007/0174082; 2008/0228641; 2010/0185534; 2011/0145007 and 2017/023929;

European Published Patent Application Nos.: EP 2168025 and EP 1360632; and all references cited therein.

SUMMARY OF THE INVENTION

The present invention seeks to provide improved systems and methodologies for automated reimbursement interactions.

There is thus provided in accordance with a preferred embodiment of the present invention a computerized immediate settlement insurance claim payment system including insurance policy issuing functionality for issuing, by an insurer, an insurance policy to an insured, and associating the policy with a payment-enabled mobile communicator to be carried by the insured and, upon the occurrence of an insured event, to be employed by the insured to cover at least part of the cost of the insured event, the insurance policy including a charge back provision allowing the insurer to charge back payments made to the insured via an identified credit card account of the insured, at least near real time automatic insurance claim verification functionality which is operative to automatically verify the right of the insured to obtain payment from the insurer by automatically verifying at least one of the value of the payment, the type of recipient entitled to receive such payment and the location of the recipient as identified by the mobile communicator, insurance claim documentation requesting functionality operative to request, at the initiative of the insurer, documentation relating to the insured event and chargeback functionality operative to charge back, at the initiative of the insurer, at least part of the payment via the identified credit card account of the insured.

Preferably, the payment-enabled mobile communicator enables at least some medical information regarding the insured to be communicated to a medical service provider. Additionally, the payment-enabled mobile communicator stores the at least some medical information regarding the insured to be communicated to a medical service provider. Alternatively, the payment-enabled mobile communicator communicates the at least some medical information regarding the insured from an external database to the medical service provider.

In accordance with a preferred embodiment of the present invention the payment-enabled mobile communicator provides at least one of recommendations and travel directions to an insured to assist in contacting a medical service provider.

Preferably, the chargeback functionality is operative, in the absence of receipt of the documentation, to charge back the payment via the identified credit card account of the insured. In accordance with a preferred embodiment of the present invention the chargeback functionality is operative, upon receipt of the documentation, to charge back at least part of the payment via the identified credit card account of the insured.

Preferably, the insured authorizes a mobile communication service provider to provide country of origin information relating to the payment-enable mobile communicator to the insurer.

In accordance with a preferred embodiment of the present invention the payment-enabled mobile communicator includes at least two of the following functionalities: insurance policy issuance functionality, payment location verification functionality, medical treatment documentation communication functionality, medical information communication functionality, medical service provider recommendation functionality, medical service provider travel directions functionality, claim eligibility ascertaining functionality, payment level eligibility functionality and claim adjudication functionality. More preferably, the payment-enabled mobile communicator includes at least five of the following functionalities: insurance policy issuance functionality, payment location verification functionality, medical treatment documentation communication functionality, medical information communication functionality, medical service provider recommendation functionality, medical service provider travel directions functionality, claim eligibility ascertaining functionality, payment level eligibility functionality and claim adjudication functionality.

There is also provided in accordance with another preferred embodiment of the present invention a computerized reimbursement system including at least one reimbursement-enabled mobile communicator having computerized memory functionality, computerized communications functionality and wireless payment functionality and at least one reimbursement-enabled computer server having computerized memory functionality and computerized communications functionality, at least one of the at least one reimbursement-enabled mobile communicator and the at least one reimbursement-enabled computer server storing reimbursement policy parameters which are selectable by a reimbursing party using the system, the reimbursement policy parameters including at least payee location and transaction amount, at least one of the at least one mobile communicator and the at least one computer server being operative to automatically complete payment transactions which are compliant with the reimbursement policy parameters and to automatically reject payment transactions which are not compliant with the reimbursement policy parameters.

Preferably, the at least one computer server is operative to seek repayment of at least a portion of a payment already made which fails to satisfy certain criteria. In accordance with a preferred embodiment of the present invention the at least one reimbursement-enabled mobile communicator is utilized by an employee of the reimbursing party and the repayment includes deducting the at least a portion of a payment from wages of the employee.

Preferably, the criteria include providing documentation relating to the payment transaction.

In accordance with a preferred embodiment of the present invention the policy parameters include at least one single transaction maximum payment amount. Additionally or alternatively, the policy parameters include at least one trip duration maximum payment amount.

Preferably, a mobile communication service provider is authorized to provide country of origin information relating to the payment-enable mobile communicator to the computerized reimbursement system.

In accordance with a preferred embodiment of the present invention the payment-enabled mobile communicator includes at least two of the following functionalities: payment location verification functionality, payment documentation communication functionality, product/service provider recommendation functionality, product/service provider travel directions functionality, reimbursement eligibility ascertaining functionality, reimbursement amount eligibility functionality and reimbursement adjudication functionality. More preferably, the payment-enabled mobile communicator includes at least four of the following functionalities: payment location verification functionality, payment documentation communication functionality, product/service provider recommendation functionality, product/service provider travel directions functionality, reimbursement eligibility ascertaining functionality, reimbursement amount eligibility functionality and reimbursement adjudication functionality.

Most preferably, the payment-enabled mobile communicator includes all of the following functionalities: payment location verification functionality, payment documentation communication functionality, product/service provider recommendation functionality, product/service provider travel directions functionality, reimbursement eligibility ascertaining functionality, reimbursement amount eligibility functionality and reimbursement adjudication functionality.

BRIEF DESCRIPTION OF THE DRAWINGS

The present invention will be understood and appreciated more fully from the following detailed description, taken in conjunction with the drawings in which:

FIGS. 1A, 1B, 1C, 1D, 1E 1F and 1G are simplified pictorial illustrations of steps in an insurer-insured interaction employing the system and methodology of a preferred embodiment of the present invention;

FIGS. 2A, 2B, 2C, 2D, 2E and 2F are simplified pictorial illustrations of steps in art insurer-insured interaction employing the system and methodology of another preferred embodiment of the present invention;

FIGS. 4A, 4B, 4C, 4D, 4E, 4F and 4G are simplified pictorial illustrations of steps in an insurer-insured interaction employing the system and methodology of another preferred embodiment of the present invention;

FIGS. 6A, 6B, 6C, 6D, 6E, 6F, 6G, 6H and 6I are simplified pictorial illustrations of steps in employee reimbursement interactions employing the system and methodology of another preferred embodiment of the present invention; and FIG. 7 is a simplified flow chart illustrating one example of the operation of the system illustrated in FIGS. 6A-6I.

DETAILED DESCRIPTION OF PREFERRED EMBODIMENTS

The embodiments described hereinbelow include various computer implemented functions, some of which may be executed by a server or other computer system and some of which may be executed by a mobile communicator. The present invention preferably includes software implemented modules stored on a tangible medium, such as a readable disk or other storage device, for performing the various functions described hereinbelow. Additionally or alternatively, the functions described hereinbelow may include computer instructions implemented in hardware.

Reference is now made to FIGS. 1A, 1B, 1C, 1D, 1E, 1F and 1G, which are simplified pictorial illustrations of steps in an insurer-insured interaction employing the system and methodology of a preferred embodiment of the present invention. The system of FIGS. 1A-1G is a computerized immediate settlement insurance claim payment system comprising insurance policy issuing functionality for issuing, by an insurer, an insurance policy to an insured, and associating the policy with an insurance card to be carried by the insured. Upon the occurrence of an insured event, the insurance card is to be presented by the insured in association with a card reader to cover at least part of the cost of the insurance event. The insurance policy includes a charge back provision allowing the insurer to charge back payments made to the insured via an identified credit card of the insured.

The immediate settlement insurance claim payment system also comprises automatic insurance claim verification functionality which, responsive to presentation of the insurance card, is operative to automatically verify the right of the insured to receive payment from the insurer by automatically verifying at least one of the value of the payment, the type of recipient entitled to receive such payment as identified by the card reader and the location of the recipient as identified by the card reader.

The immediate settlement insurance claim payment system also comprises insurance claim documentation requesting functionality operative to request from the insured, at the initiative of the insurer, following paying of the payment, documentation relating to the insured event, and chargeback functionality operative to charge back, at the initiative of the insurer, in the absence of receipt of the documentation, at least part of the payment via the identified credit card of the insured.

Figure 1A:
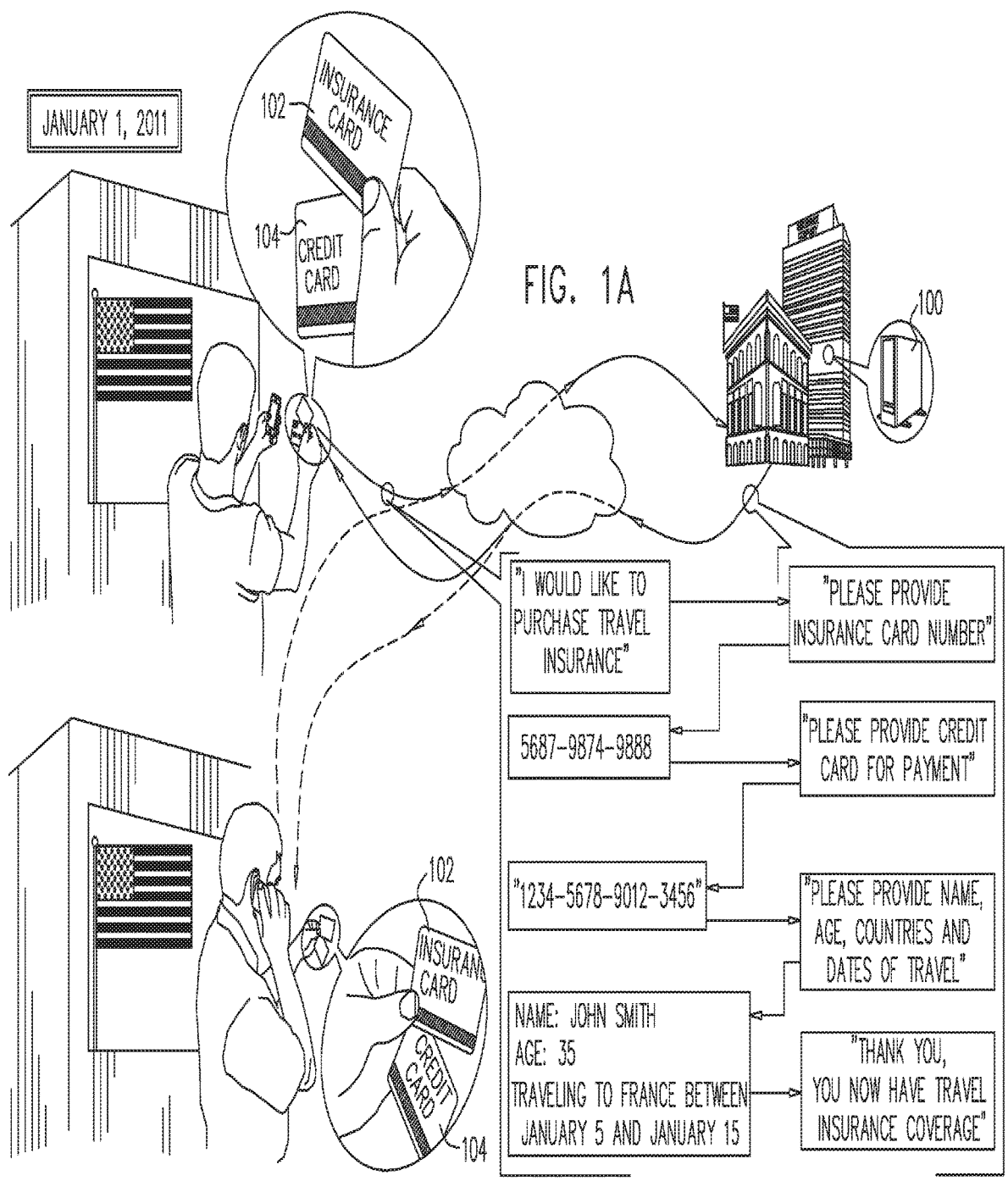

As shown in FIG. 1A, prior to traveling, such as on Jan. 1, 2011, a potential purchaser of travel insurance contacts an insurer which utilizes a self-executing insurance claim payment system 100, to purchase travel insurance to be associated with an insurance card 102 using a credit card 104. It is appreciated that insurance card 102 may be distributed free of charge by travel agencies, publishers of travel information, or by any other entity. As seen in FIG. 1A, contact with the insurer may be via telephone or via an automated telephone-operated system.

Upon establishing contact with the insurer, the potential purchaser of travel insurance is prompted for an insurance card identification number and for personal credit card information to pay for the travel insurance. It is appreciated that a potential purchaser of travel insurance may not be in possession of an insurance card when contacting the insurer, and may be provided with an insurance card after purchasing the travel insurance.

Additionally, the potential purchaser of travel insurance is prompted for information pertaining to his future travels, such as dates of travel and destination. Upon providing the requested information, the information is stored in system 100 which provides confirmation of purchase of travel insurance to the purchaser.

It is a particular feature of the present invention that an insurance card 102, once associated with an insurance contract, preferably serves as a debit card to which reimbursements of expenses incurred by the insured under the coverage provided by the insurance contract are transferred, under the terms of the insurance contract.

Figure 1B:
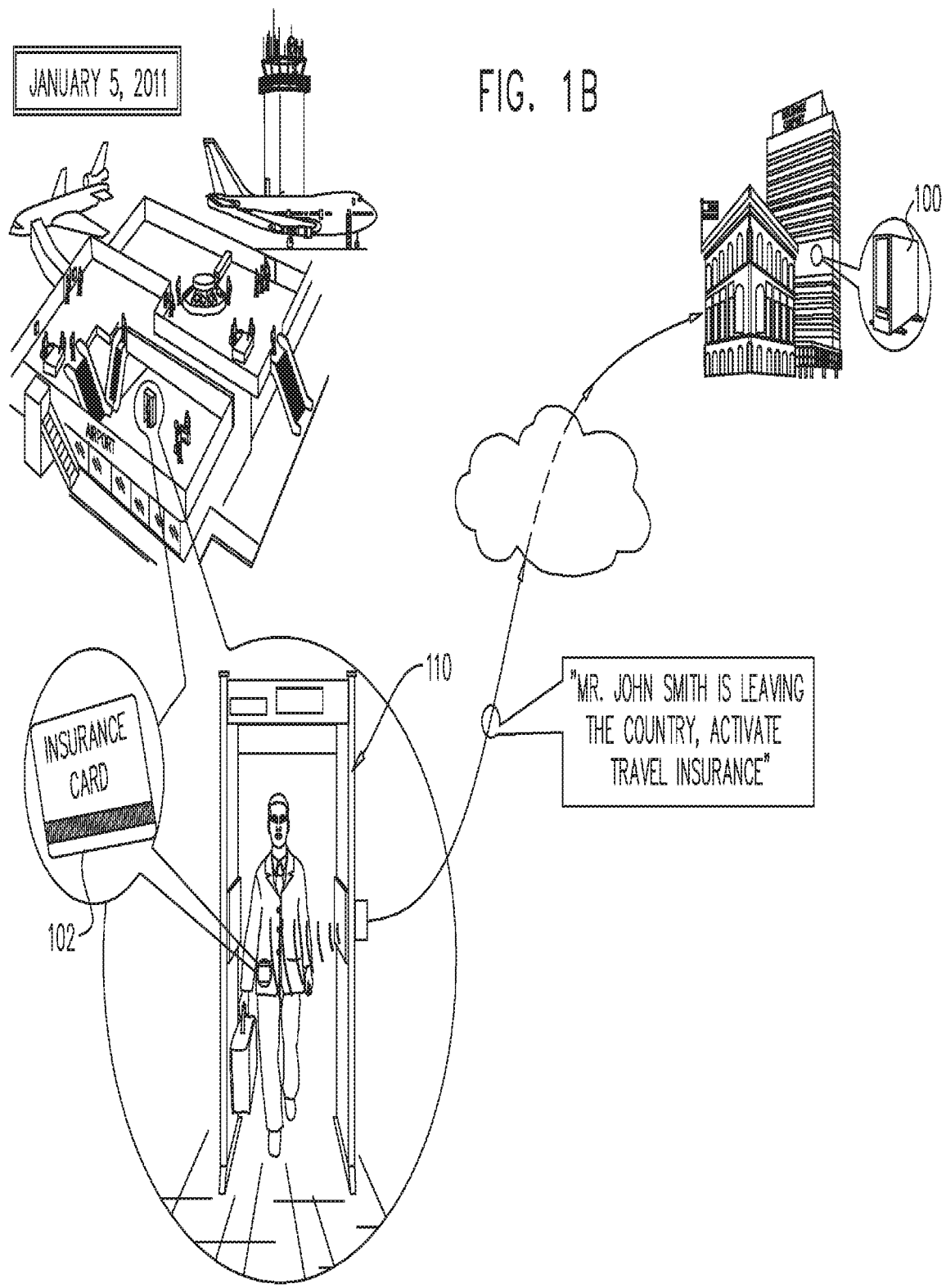

Turning now to FIG. 1B, it is shown that on the planned date of departure of January 5, the insured arrives at a port of departure such as an airport. Once inside the port of departure, the insured preferably passes through a portal 110 which automatically detects the insured's insurance card 102, such as by an RFID mechanism which is part of portal 110, which mechanism detects an RFID chip embedded in insurance card 102, and thereby ascertains the insured's presence at the port of departure. Alternatively, the insured's presence at the port of departure may be ascertained by determining the location of the insured's cell phone using standard cell phone locating techniques.

Upon ascertaining the insured's presence at the port of departure, a communication system (not shown) which is part of portal 110 notifies self-executing insurance claim payment system 100 of the insured's imminent departure, which causes system 100 to automatically activate the insured's travel insurance. Alternatively, upon ascertaining the insured's presence at the port of departure, the insurer may contact the insured before activating the insured's travel insurance to verify the insured's present medical condition or travel plans. In the absence of mechanisms operative to automatically ascertain the insured's presence at the port of departure, the insured may contact the insurer to report his imminent departure, and to request activation of the insurance.

Turning now to FIG. 1C, it is shown that while abroad, on a later date such as on January 10, the insured injures his leg. The insured is taken to a hospital 120 by an ambulance 122 and provides access to his medical history to the hospital staff. Preferably, the insured's medical history is encoded on insurance card 102 at the time of purchase of the travel insurance.

As shown in FIG. 1C, the insured receives appropriate medical treatment, and contacts the insurer to report details of the injury and of the medical facility where treatment is being received, and to request advance funding of the estimated cost of the treatment. In response, the insured is prompted to provide personal credit card details for guarantee.

It is a particular feature of the present invention that self-executing insurance claim payment system 100 includes fraud detection functionality which is automatically operative to detect, with a high degree of certainty, fraudulent claims reported to the insurer. This detection may be achieved, for example, by voice analysis techniques or by statistical analysis.

It is another particular feature, of the present invention that for claims winch system 100 determines, smith a high degree of certainty, to be legitimate, system 100 is operative to automatically provide advance funding of expected medical expenses incurred by the insured under the coverage provided by the insurance, based on the reporting by the insured of the medical expense incurred. Preferably, advance funding is automatically transferred by system 100 to the insured's insurance card 102. Alternatively, the advance funding be provided to the insured, for example, by crediting the insured's credit\debit card, bank account, or any other personal banking or crediting system.

It is yet another particular feature of the present invention that the system 100 requires that credit card details of the insured be provided to serve as a guarantee to be invoked by the system 100 to reimburse the insurer in a case where the insured has received from the insurer compensation for fraudulent or unjustified insurance claims, despite activation of the fraud detection functionality.

It is appreciated that system 100 comprises a knowledge base which facilitates calculation of expected medical expenses, which knowledge base includes accumulated statistics of cost of treatment of a wide range of medical treatments provided in any of a wide range of locales and medical institutions around the world.

Returning now to FIG. 1C, upon determining with is high degree of certainty that the insured's claim is legitimate, and upon obtaining a guarantee in the form of the insured's personal credit card details, advance funding is preferably provided to the insured via the insured's insurance card 102. As seen in FIG. 1C, the insured's insurance card 102 is credited with $500, which is the expected cost of the insured's medical expense as estimated by system 100.

Upon checking out of the hospital 120 the insured is charged $435 for the medical treatment he received at the hospital 120, which the insured pays using insurance card 102. It is appreciated that the actual charge of $435 is less than the $500 credited to insurance card 102.

Alternatively, as shown in FIG. 1D, the insured defers contacting the insurer until after completing the medical treatment and after paying $435 to the hospital 120. Payment may be achieved, for example, by charging the insured's credit card 104. After checking out of the hospital 120, the insured contacts the insurer to report the injury and to request reimbursement for the cost of the treatment. In response, the insured is prompted to provide personal credit card details for guarantee. Upon determining with a high degree of certainty that the insured's claim is not fraudulent or unjustified, and upon obtaining a guarantee in the form of the insured's personal credit card 104 details, reimbursement is preferably provided to the insured via the insured's insurance card 102, personal credit card 104, personal debit card, or to the insured's bank account. As seen in FIG. 1D, subsequent to the reimbursement, the insured withdraws the reimbursed sum of $435 via an ATM machine 130.

Figure 1E:
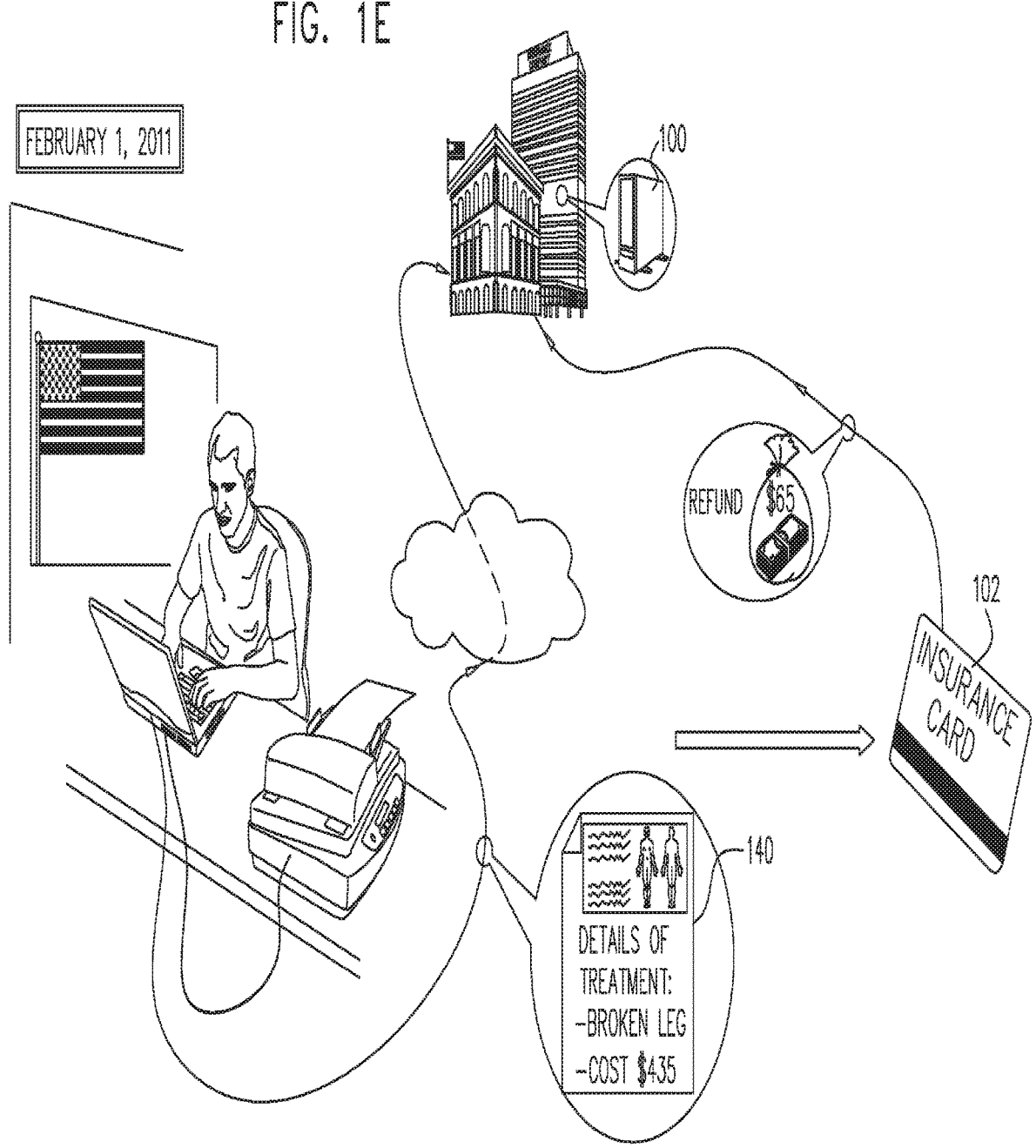

Turning now to FIG. 1E, it is shown that upon returning from abroad, such as on February 1 the insured provides documentation 140 to the insurer regarding medical treatment provided and any related costs incurred during the insured's trip abroad. Upon receiving documentation 140 of the treatment and its cost of $435 from the insured, self-executing insurance claim payment system 100 collects any difference between sums previously forwarded to the insured and the actual justified cost of the treatment as determined by the insurer, from the insured's insurance card 102. In the scenario of FIG. 1C, this difference is winch is the difference between the $500 originally forwarded to the insured and the $435 which the insured actually paid for the treatment.

Figure 1F:
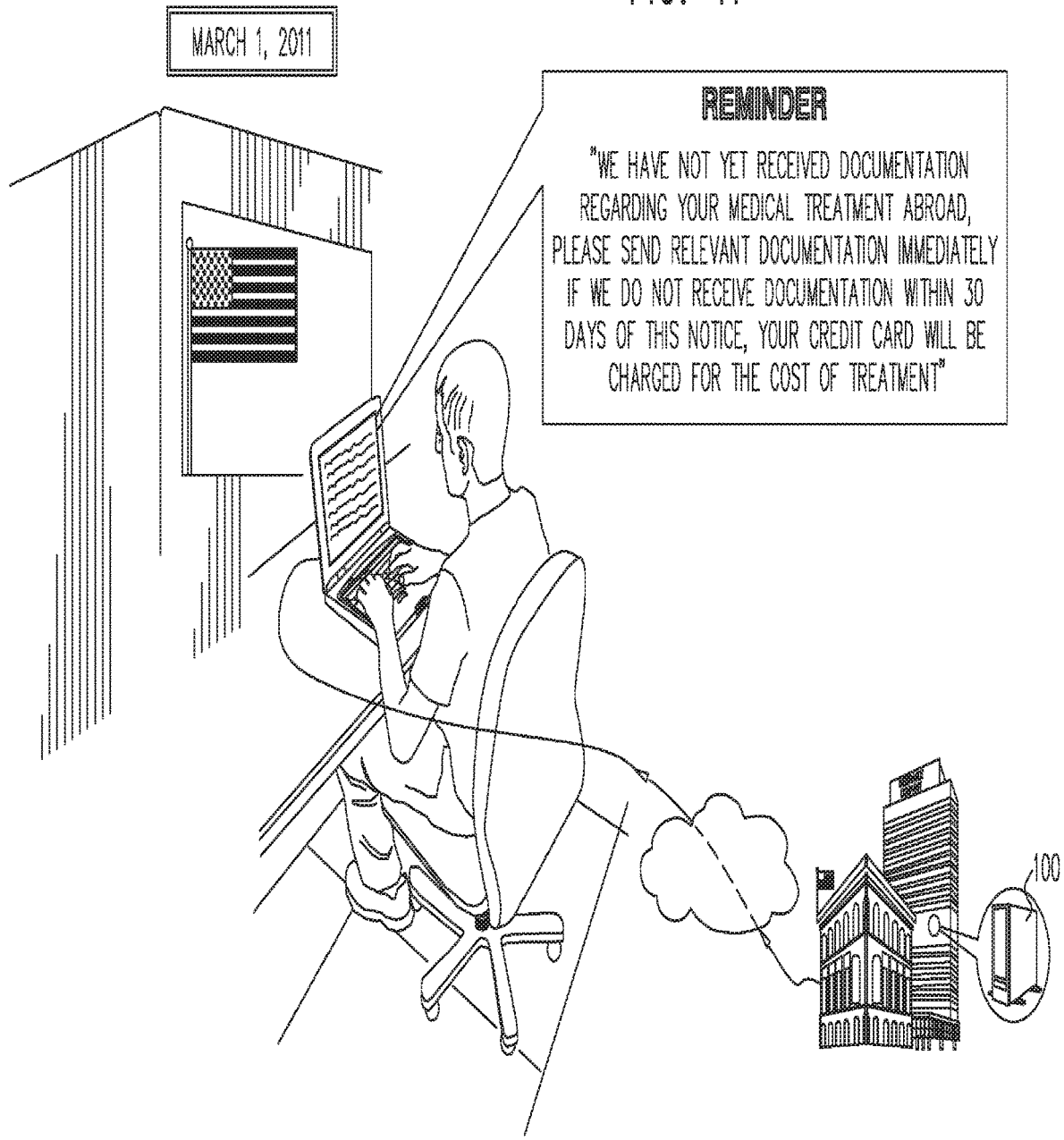

Alternatively, as shown in FIG. 1F, should the insured fail to provide such documentation within a reasonable amount of time, such as by March 1, self-executing insurance claim payment system 100 sends the insured a reminder to provide the documentation, warning him that failure to do so will result in the insurer invoking the guarantee provided in the form of credit card 104, as described hereinabove with regard to FIGS. 1C & 1D.

Figure 1G:
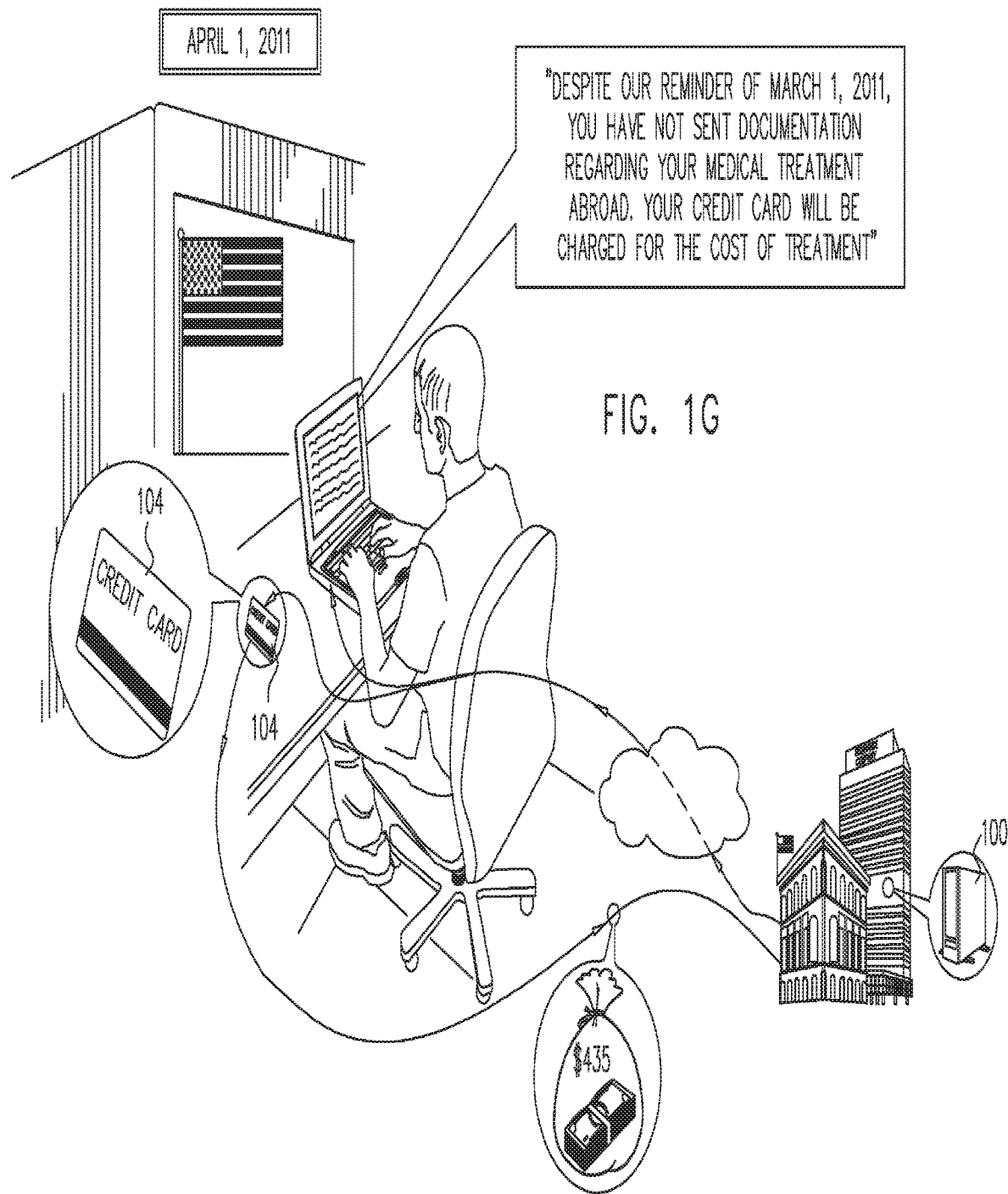

As shown in FIG. 1G, should the insured fail to provide relevant documentation by April 1, despite the warning sent by the insurer, self-executing insurance claim payment system 100 invokes the guarantee provided in the form of credit card 104, and charges the insured's credit card 104 for the total amount of $435 previously provided to the insured.

Figure 2A:
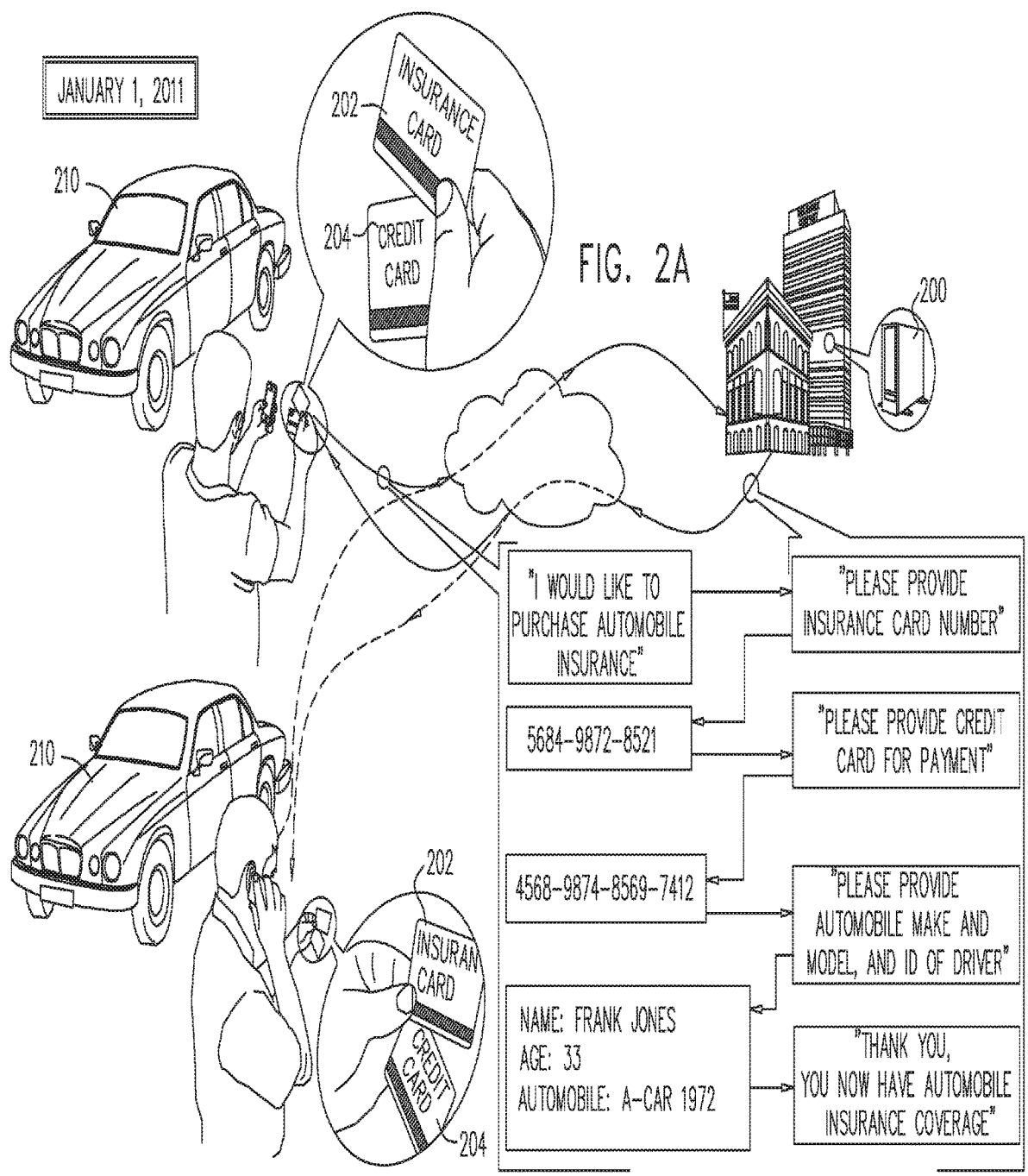

Reference is now made to FIGS. 2A, 2B, 2C, 2D, 2E and 2F, which are simplified pictorial illustrations of steps in an insurer-insured interaction employing the system and methodology of another preferred embodiment of the present invention. As shown in FIG. 2A, on Jan. 1, 2011, a potential purchaser of automobile insurance contacts an insurer which utilizes a self-executing insurance claim payment system 200, to purchase automobile insurance to be associated with an insurance card 202 using a credit card 204. It is appreciated that insurance card 202 may be distributed free of charge by automobile dealers, or by any other entity. As seen in FIG. 2A, contact with the insurer may be via telephone or via an automated telephone-operated system.

Upon establishing contact with the insurer, the potential purchaser of automobile insurance is prompted for an insurance card identification number and for personal credit card information. It is appreciated that a potential purchaser of automobile insurance may not be in possession of an insurance card when contacting the insurer, and may be provided with an insurance card after purchasing the automobile insurance.

Additionally, the potential purchaser of automobile insurance is prompted for information pertaining to the automobile 210 to be insured, such as make and model and identification of designated drivers. Upon providing the requested information, the information is stored in system 200 which provides confirmation of purchase of automobile insurance to the purchaser and activates the automobile insurance.

Turning now to FIG. 2B, it is shown that on a later date such as on January 10, the insured automobile 210 is involved in an automobile accident. The automobile 210 is towed to a garage 220 where it is repaired. As shown in FIG. 2B, the insured contacts the insurer to report details of the accident and of the garage where repairs are being made to the automobile 210, and to request advance funding of the estimated cost of the repairs. In response, the insured is prompted to provide personal credit card details for guarantee.

It is a particular feature of the present invention that self-executing insurance claim payment system 200 includes fraud detection functionality which is automatically operative to detect, with a high degree of certainty, fraudulent claims reported to the insurer. This detection may be achieved, for example by voice analysis techniques or by statistical analysis.

It is another particular feature of the present invention that for claims which system 200 determines, with a high degree of certainty, to be legitimate, system 200 is operative to automatically provide advance funding of expected expenses incurred by the insured under the coverage provided by the insurance, based on the reporting by the insured of the expense incurred. Preferably, advance funding is automatically transferred by system 200 to the insured's insurance card 202. Alternatively, the advance funding may be provided to the insured, for example, by crediting the insured's credit\debit card, bank account, or any other personal banking or crediting system.

It is yet another particular feature of the present invention that the system 200 requires that credit card details of the insured be provided to serve as a guarantee to be invoked by the system 200 to reimburse the insurer in a case where the insured has received from the insurer compensation for fraudulent or unjustified insurance claims, despite activation of the fraud detection functionality.

It is appreciated that system 200 comprises a knowledge base which facilitates calculation of expected automobile repair expenses, which knowledge base includes accumulated statistics of cost of a wide range of automobile repairs provided in any of a wide range of locales.

Returning now to FIG. 2B, upon determining with a high degree of certainty that the insured's claim is legitimate, and upon obtaining a guarantee in the form of the insured's personal credit card details, advance funding is preferably provided to the insured via the insured's insurance card 202. As seen in FIG. 2B, the insured's insurance card 202 is credited with $1000, which is the expected cost of the insured's automobile repairs as estimated by system 200.

Upon checking out of the garage 220, the insured is charged $875 for the repairs done at the garage 220, which the insured pays using insurance card 202. It is appreciated that the actual charge of $875 is less than the $1000 credited to insurance card 202.

Figure 2C:
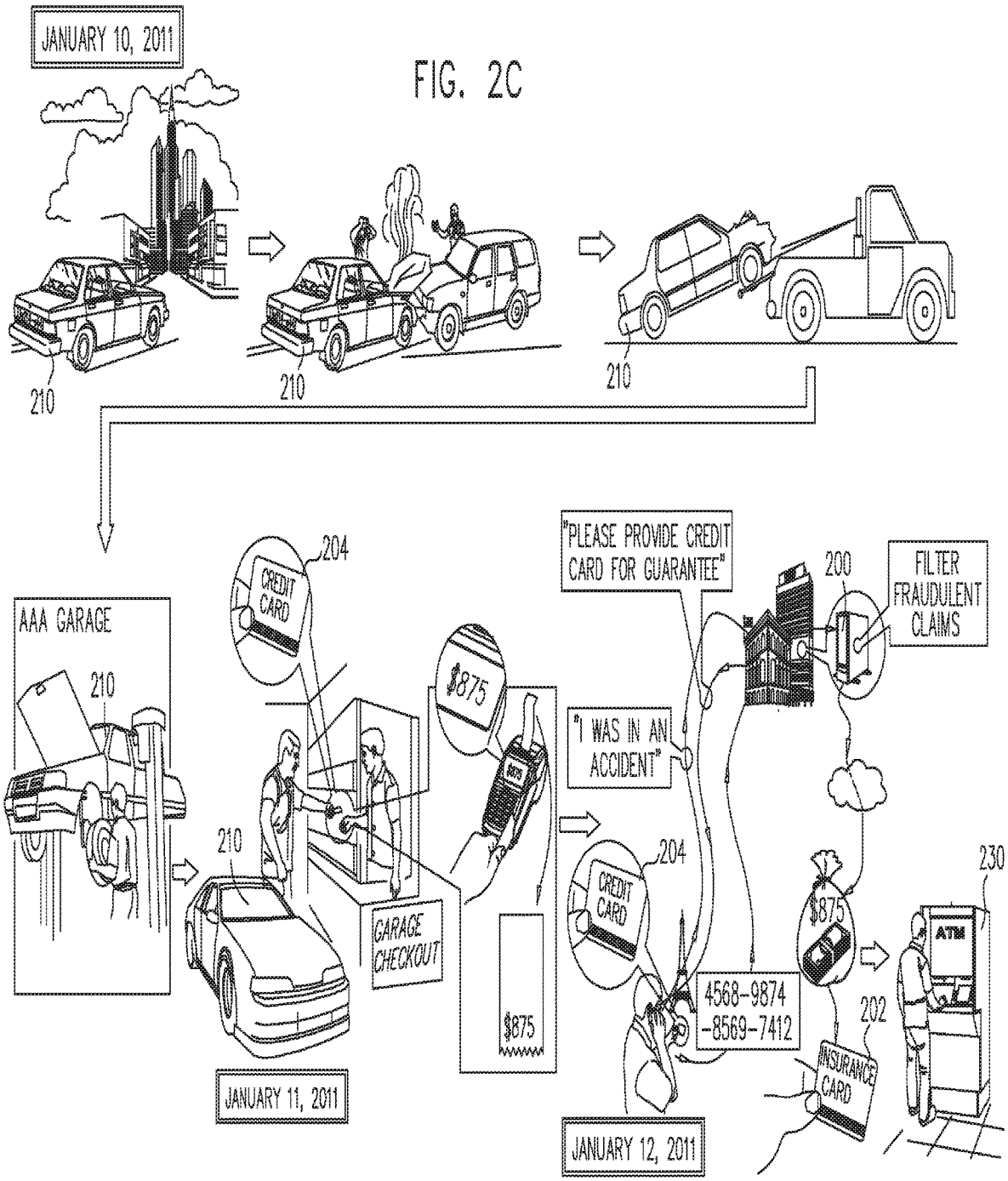

Alternatively, as shown in FIG. 2C, the insured defers contacting the insurer until after repairs to the automobile 210 are completed and after paying $875 to the garage 220. Payment may be achieved, for example, by charging the insured's credit card 204. After checking out of the garage 220, the insured contacts the insurer to report the accident and to request reimbursement for the cost of the repairs. In response, the insured is prompted to provide personal credit card details for guarantee. Upon determining with a high degree of certainty that the insured's claim is not fraudulent or unjustified, and upon obtaining a guarantee in the form of the insured's personal credit card 204 details, reimbursement is preferably provided to the insured via the insured's insurance card 202, personal credit card 204, personal debit card, or to the insured's bank account. As seen in FIG. 2C, subsequent to the reimbursement, the insured withdraws the reimbursed sum of $875 via an ATM machine 230.

Turning now to FIG. 2D, it is shown that at a later date, such as on February 1, the insured provides documentation 240 to the insurer regarding automobile repairs provided and any related costs. Upon receiving documentation 240 of the repairs and its cost of $875 from the insured, self-executing insurance claim payment system 200 collects any difference between sums previously forwarded to the insured and the actual justified cost of the repairs as determined by the insurer, from the insured's insurance card 202. In the scenario of FIG. 2B, this difference is $125, which is the difference between the $1000 originally forwarded to the insured and the $875 which the insured actually paid for the repairs.

Figure 2E:
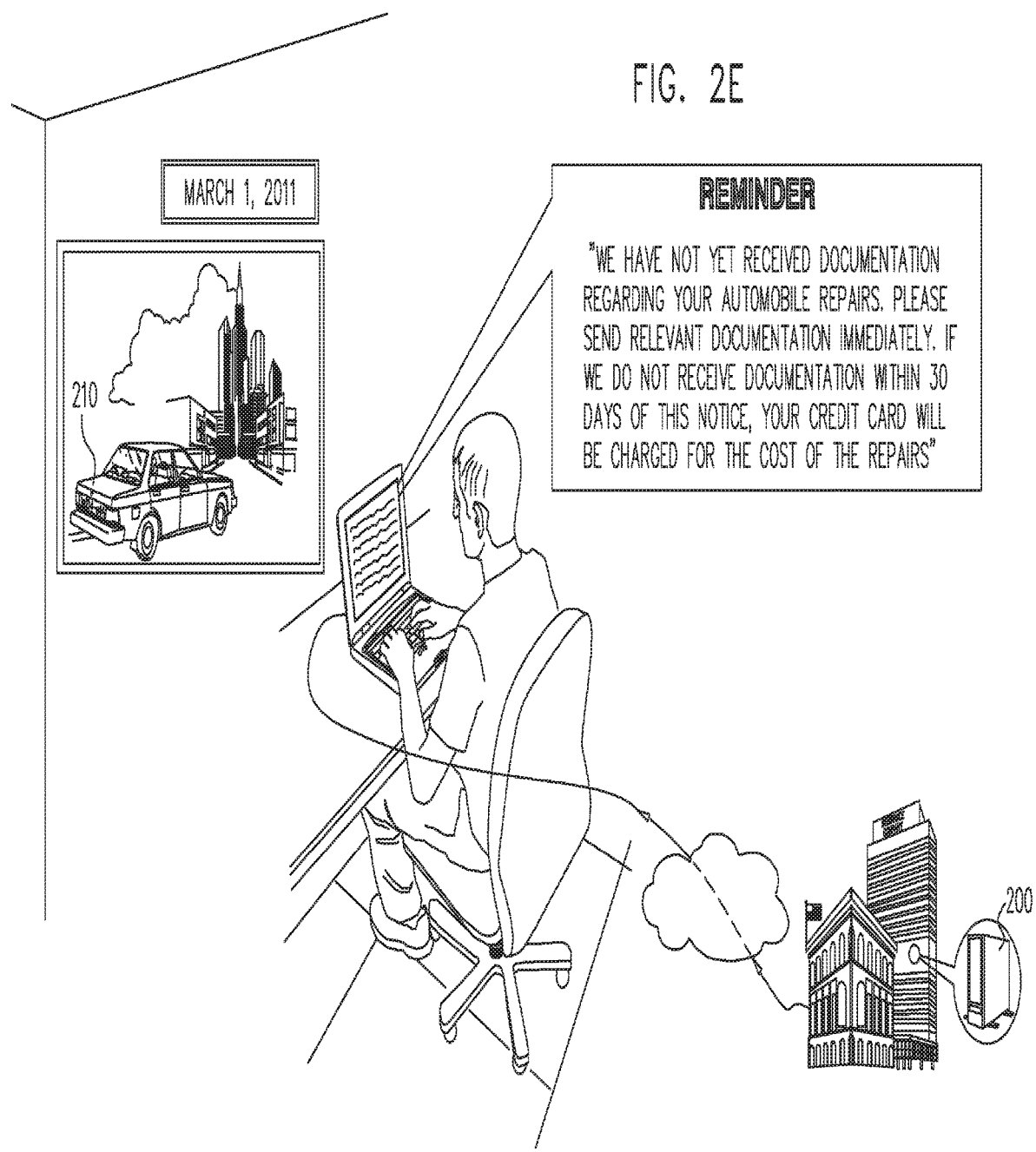

Alternatively, as shown in FIG. 2E, should the insured fail to provide such documentation within a reasonable amount of time, such as by March 1, self-executing insurance claim payment system 200 sends the insured a reminder to provide the documentation, warning him that failure to do so will result in the insurer invoking the guarantee provided in the form of credit card 204, as described hereinabove with regard to FIGS. 2B & 2C.

Figure 2F:
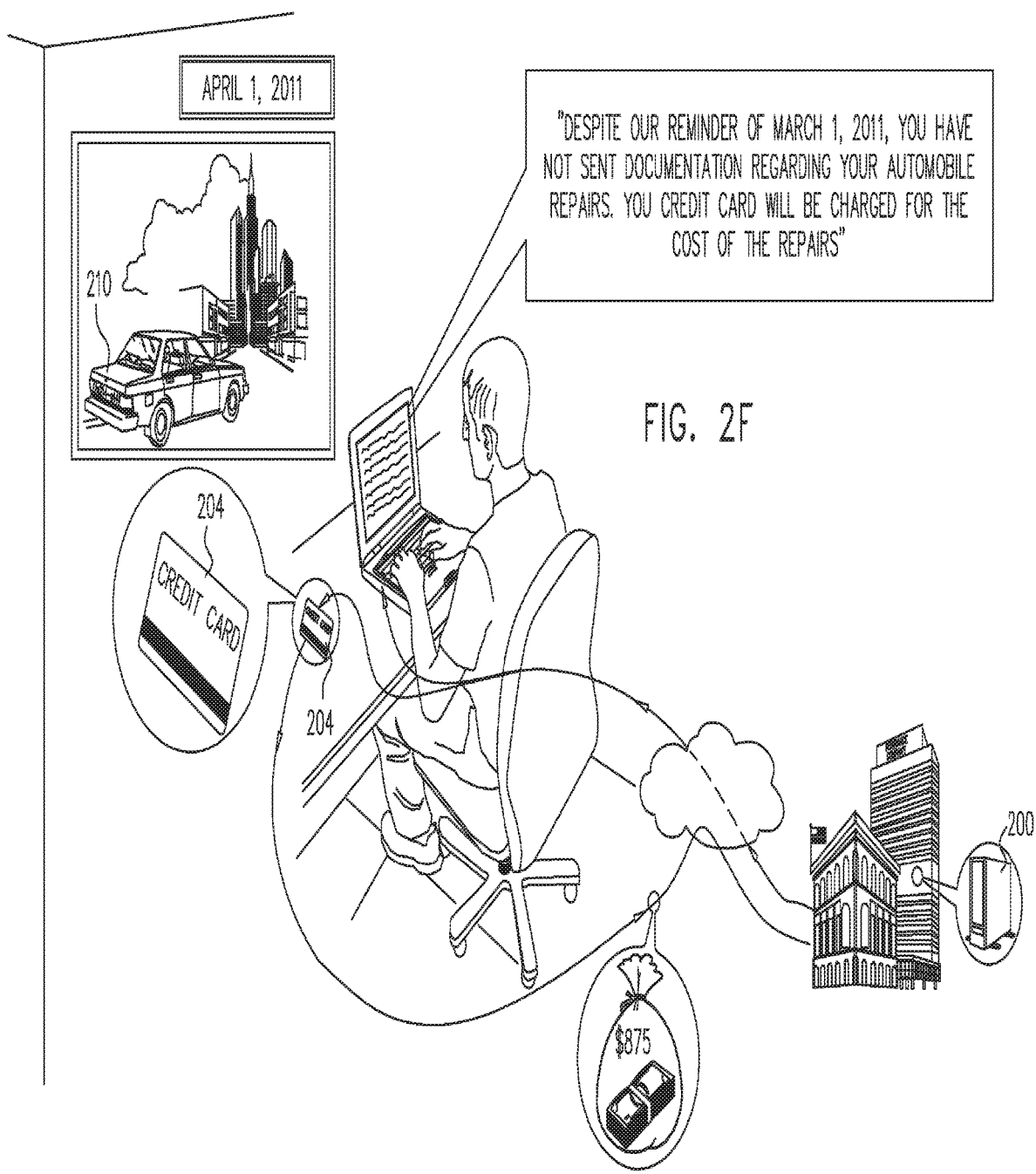

As shown in FIG. 2F, should the insured fail to provide relevant documentation by April 1, despite the warning sent by the insurer, self-executing insurance claim payment system 200 invokes the guarantee provided in the form of credit card 204, and charges the insured's credit card 204 for the total amount of $875 previously provided to the insured.

Figure 3A:
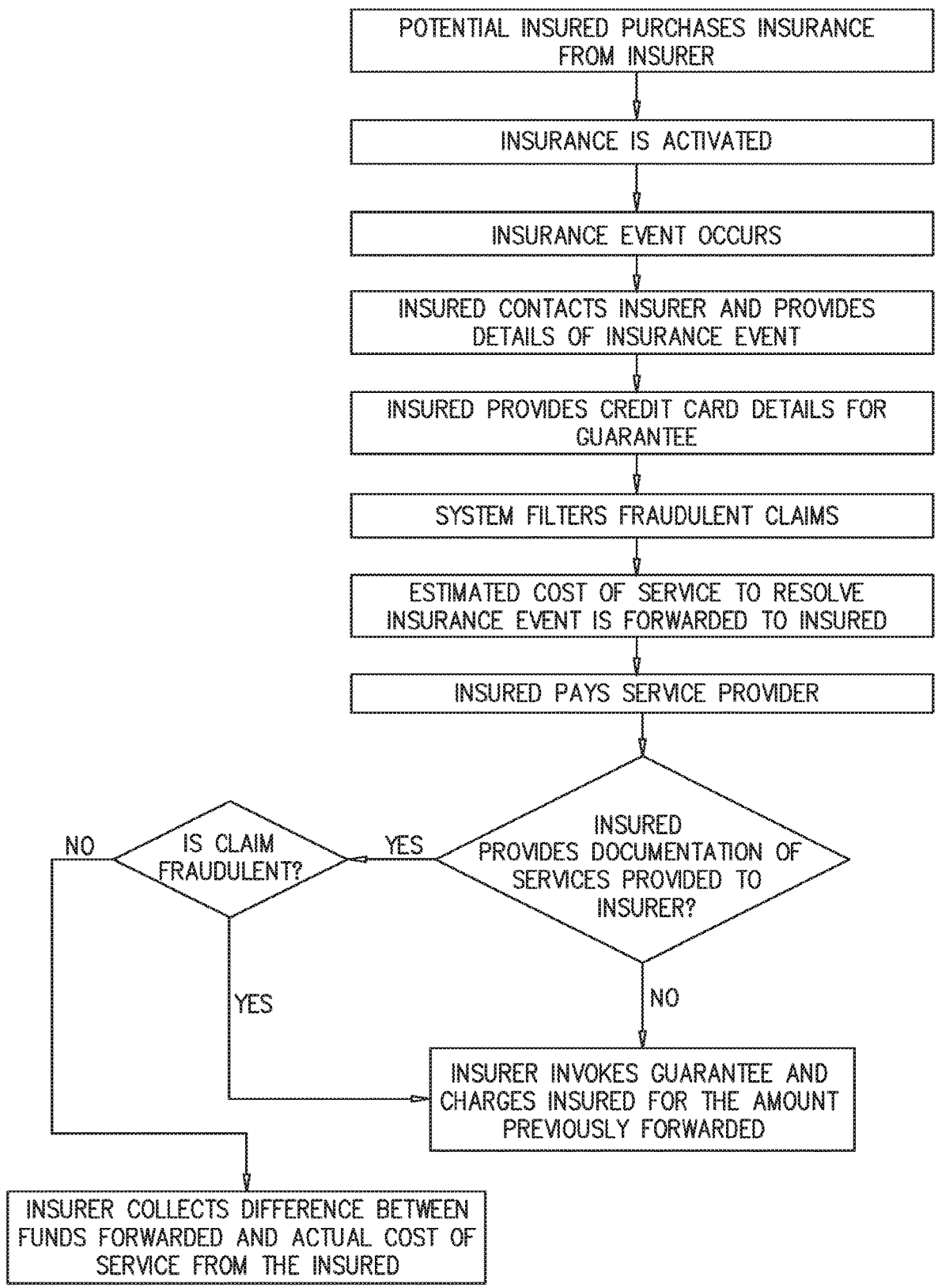
FIG. 3A is a simplified flow chart illustrating one example of the operation of the system of FIGS. 1A-2F.

Reference is now made to FIG. 3A, which is a simplified flow chart illustrating one example of the operation of the system of FIGS. 1A-2F. As shown in FIG. 3A, a potential purchaser of insurance purchases insurance from an insurer, which insurance is then activated by the insurer. After the occurrence of an insured event which is covered by the insurance, the insured contacts the insurer, provides details of the insured event and provides personal credit card details for guarantee. All of the foregoing is preferably achieved via data communication between a potential purchaser's computer, most preferably his mobile communicator, and a server of the insurer, without real time human intervention on the part of the insurer. An insured event run be any event whose resolution thereof which is covered under the terms of the purchased insurance.

The system, upon ascertaining with a high degree of certainty that the insured's claim is not fraudulent, forwards the estimated cost of resolving the insured event to the insured. The insured uses the forwarded funds to pay a service provider for services received to resolve the insured event. Upon providing, by the insured, documentation and details of the cost of services provided to the insured, the insurer utilizes the documentation to ascertain that the insured's claim is legitimate and not fraudulent. The insurer then collects the difference between the sum previously forwarded to the insured's insurance card and the actual cost of service as paid by the insured, from the insured insurance card. If the insured does not provide relevant documentation within a reasonable timeframe, or if the documentation is not sufficient to prove the legitimacy of the insured's claim, the insurer invokes the guarantee and charges the insured's credit card for the amount previously forwarded.

Figure 3B:
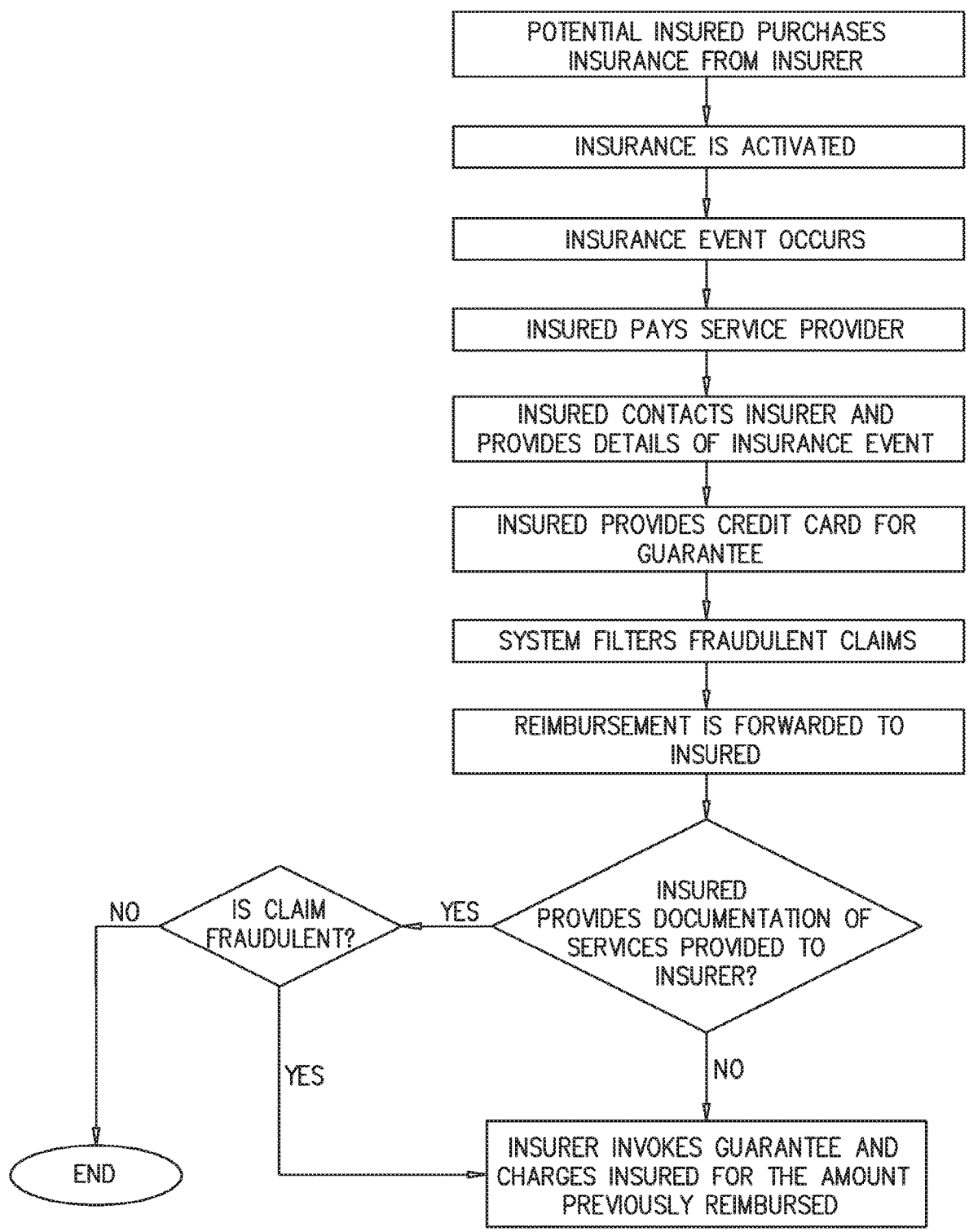
FIG. 3B is a simplified flow chart illustrating another example of the operation of the system of FIGS. 1A-2F.

Reference is now made to FIG. 3B, which is a simplified flow chart illustrating another example of the operation of the system of FIGS. 1A-2F. As shown in FIG. 3B, a potential purchaser of insurance purchases insurance from an insurer, which insurance is then activated by the insurer. After the occurrence of an insured event which is covered by the insurance, the insured pays a service provider for services received in conjunction with the insured event. The insured then contacts insurer and provides to the insurer details of the insured event and personal credit card details for guarantee. The system, upon ascertaining with a high degree of certainty that the insured's claim is not fraudulent, forwards to the insured reimbursement of sums paid by the insured to the service provider, and requests the insured to provide documentation of the services provided and costs thereof to the insurer. If the insured does not provide relevant documentation within a reasonable timeframe, or if the documentation is not sufficient to prove the legitimacy of the insured's claim, the insurer invokes the guarantee and charges the insured's credit card for the amount previously reimbursed.

Reference is now made to FIGS. 4A, 4B, 4C, 4D, 4E, 4F and 4G, which are simplified pictorial illustrations of steps in an insurer-insured interaction employing the system and methodology of another preferred embodiment of the present invention. The system of FIGS. 4A-4G is a computerized immediate settlement insurance claim payment system comprising insurance policy issuing functionality for issuing, by an insurer, an insurance policy to an insured, and associating the policy with a mobile communicator to be carried by the insured. Upon the occurrence of an insured event, the mobile communicator is to be used by the insured to communicate information associated with at least one of and preferably all of: the insured, the insurance policy and the insurance event. This communication may be with a services provider, such as a medical services provider, or the insurer and is preferably with both. The communicator may also be employed to facilitate communication between the services provider and the insurer.

The communicator may additionally be used to store or access remotely stored information relating to the insured, such as, for example, the insured's medical history, the insured's insurance history and other information provided by the insured or accessible from remote databases.

The insurance policy preferably includes a charge back provision allowing the insurer to charge back payments made to the insured via an identified credit card account of the insured.

The immediate settlement insurance claim payment system also comprises automatic insurance claim verification functionality which, responsive to the above communications, is operative to automatically verify the right of the insured or the service provider to receive payment from the insurer by automatically verifying at least one of the identity of the insured, the entitlement of the insured to services to be paid by the insurer based, inter alia, on the personal information of the insured which is stored on the communicator or accessible using the communicator, the value of the payment to be made by the insurer, the location of the service provider and other information relating to the service provider.

The immediate settlement insurance claim payment system preferably also comprises insurance claim documentation requesting functionality operative to request from the insured, at the initiative of the insurer, prior to, concurrently with or following the payment, documentation relating to the insured event, and chargeback functionality operative to charge back, at the initiative of the insurer, in the absence of receipt of the documentation, at least part of the payment via the identified credit card account of the insured.

Figure 4A:
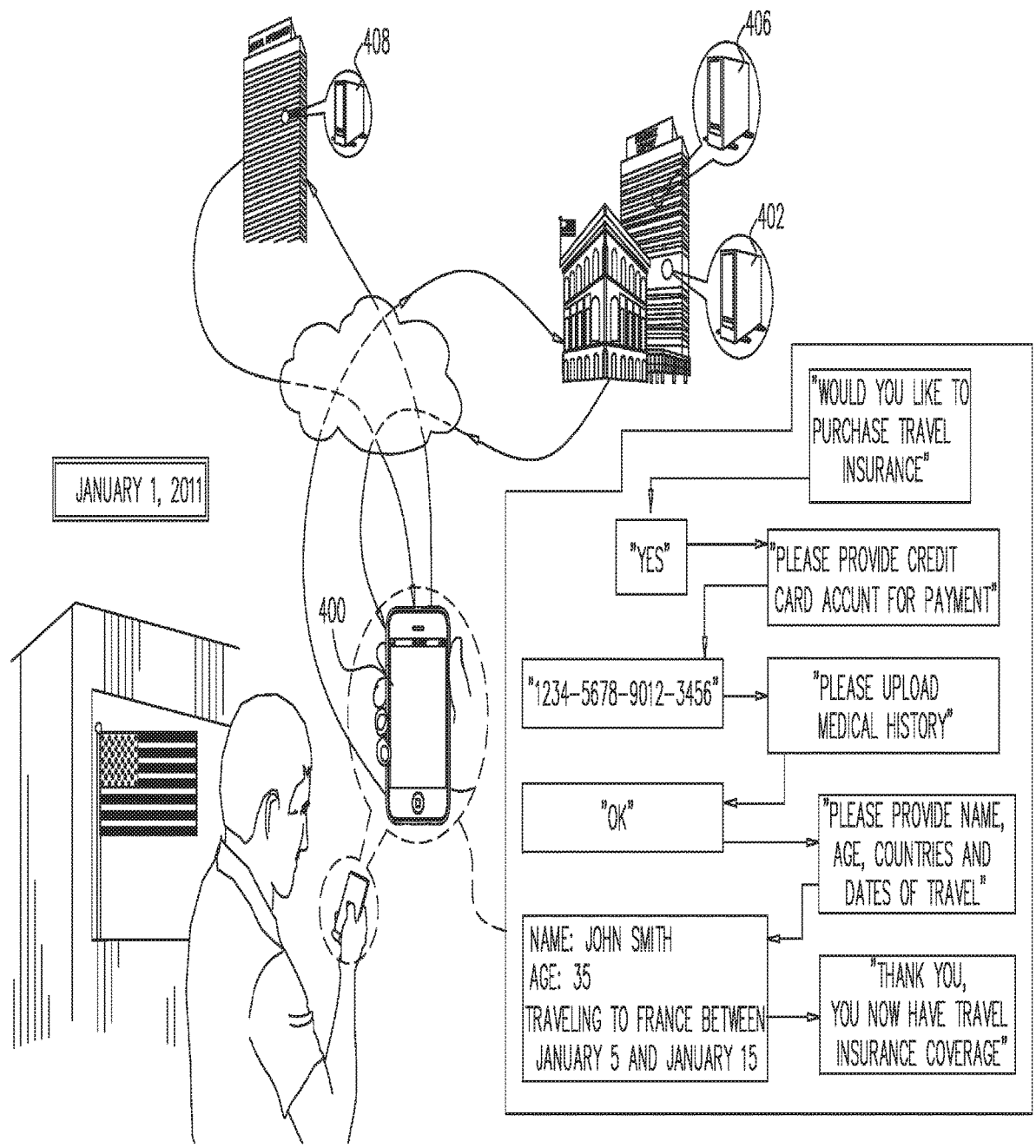

As shown in FIG. 4A, prior to traveling, such as on Jan. 1, 2011, a potential purchaser of travel insurance contacts an insurer, preferably by employing a payment-enabled mobile communicator 400 and utilizing a self-executing insurance claim payment system 402 to purchase a travel insurance policy. Self-executing insurance claim payment system 402 preferably includes a server operative to execute computer instructions and may be implemented in hardware and/or by executing software instructions stored on a tangible medium. As described further hereinbelow, system 402 preferably also includes data communication functionality to enable communication with payment-enabled mobile communicator 400 and with other devices associated with system 402.

The travel insurance policy may be paid for by using the payment-enabled mobile communicator 400 in a conventional manner using the purchaser's credit card account. It is appreciated that the contact with the insurer may be via the payment-enabled mobile communicator 400, as shown in FIG. 4A, via a data application or by voice vis-à-vis a human operator or an automated telephone-operated system. Alternatively, the entire policy purchase transaction may be conducted using the internet either via the payment-enabled mobile communicator 400 or another computer.

Upon establishing contact with the insurer, the potential purchaser of travel insurance is prompted to provide his credit card account information to pay for the travel insurance. This may be done seamlessly when using a payment-enabled mobile communicator 400.

In the case of medical insurance, the potential purchaser is preferably prompted to upload his medical history. This medical history may be uploaded manually by the potential purchaser but more preferably is downloaded directly either to the payment-enabled mobile communicator 400 or to an insurer's secure server 406 from a repository 408 which maintains this information, in response to entry of an appropriate password or passwords. It is appreciated that the personal information regarding the insured is stored, whether on the mobile communicator 400 or on the insurer's secure server 406, using appropriate password safeguards, which may be multi-level password safeguards depending on the sensitivity of the information.

Additionally, the potential purchaser of travel insurance may be prompted for information pertaining to his future travels, such as dates of travel and destination. Upon providing the requested information, the information is stored in system 402, which provides confirmation of purchase of travel insurance to the purchaser.

It is a particular feature of the present invention that the mobile communicator 400, once associated with an insurance contract, preferably serves as a debit card to which reimbursements of expenses incurred by the insured under the coverage provided by the insurance contract are transferred, under the terms of the insurance contract.

Figure 4B:
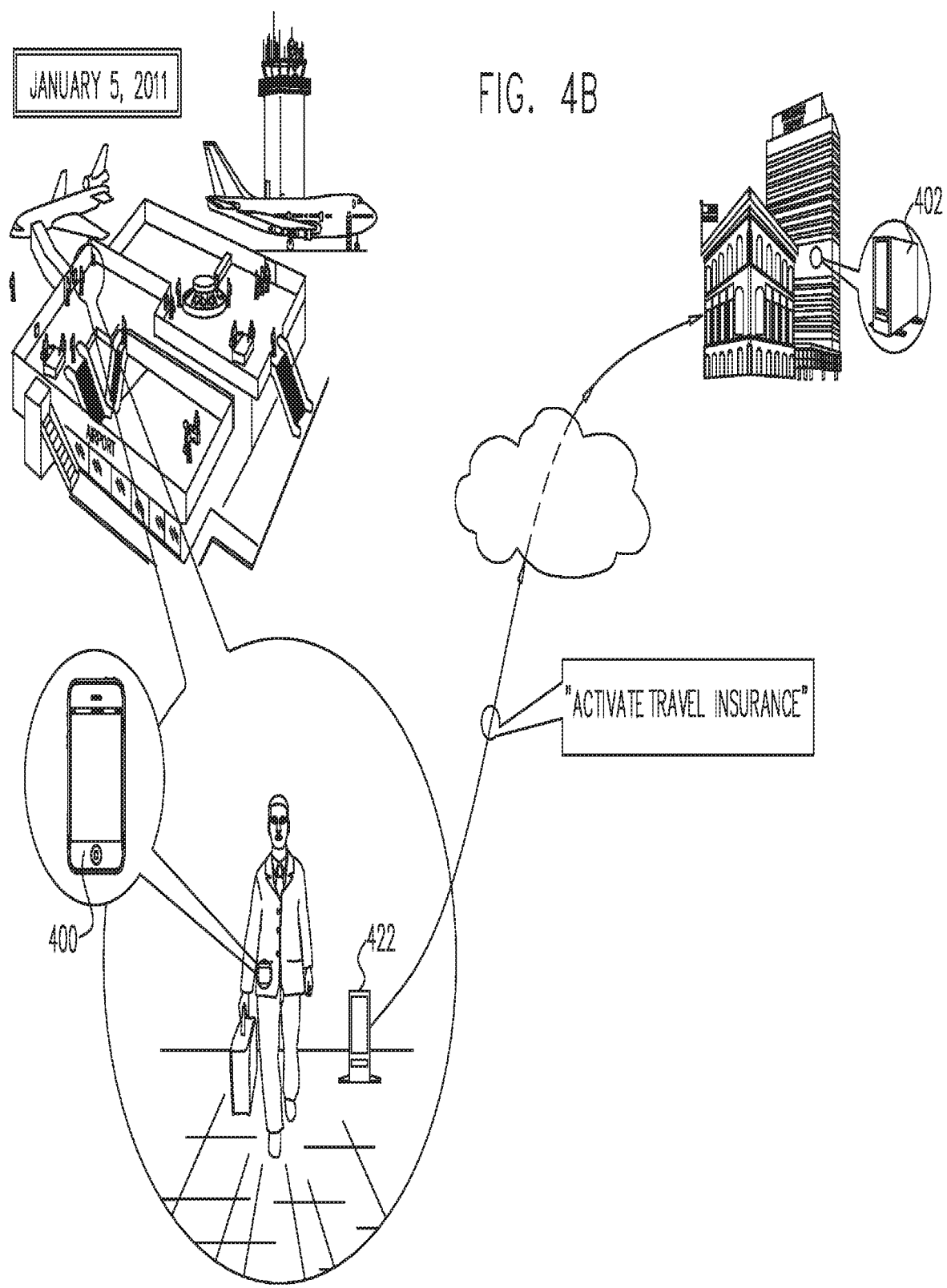

Turning now to FIG. 4B, it is shown that on the planned date of departure of January 5, the insured arrives at a port of departure, such as an airport. Once inside the port of departure, the insured's mobile communicator 400 indicates its location using standard cell phone locating techniques and thereby confirms the insured's presence at the port of departure.

Upon ascertaining the insured's presence at the port of departure, a communication system 422 notifies self-executing insurance claim payment system 402 of the insured's imminent departure, which causes system 402 to automatically activate the insured's travel insurance. Alternatively, upon ascertaining the insured's presence at the port of departure, the insurer may contact the insured, preferably using the insured's mobile communicator 400, before activating the insured's travel insurance to verify the insured's present medical condition or travel plans. In the absence of mechanisms operative to automatically ascertain the insured's presence at the port of departure, the insured may contact the insurer, preferably using the insured's mobile communicator 400, to report his imminent departure, and to request activation of the insurance. As a further alternative, activation may take place automatically at a date and time selected by the insured.

Turning now to FIG. 4C, it is seen that while abroad, on a later date such as on January 10, the insured injures his leg. The insured is taken to a hospital by an ambulance and provides access to his medical history to either or both the ambulance staff and the hospital staff, preferably using the insured's mobile communicator 400 either to download the medical history stored in mobile communicator 400 or to access it from server 406. It is appreciated that the insured's mobile communicator 400 may have embedded therein PIN-activatable security codes which may be used to access information regarding the insured, such as his medical history and his insurance claim history. Multiple, different PIN codes may be employed for multiple different levels of security. A PIN-code override functionality may be provided via system 402 for emergency use when the insured is unconscious or otherwise unable to enter his PIN code.

Preferably, the insured's personal information including his medical and insurance history is divided into a plurality of different categories, each having its own different level of security, such as:

a. Basic personal information, such as name, address, contact telephone numbers, languages spoken, photograph, height, weight and known drug allergies;

b. Allergies, history of illnesses and treatments emergency contact details; and c. Genetic characteristics and family history.

It is also appreciated that information, such as medical histories of multiple insured persons, such as members of a family travelling together, may be stored or accessible using a single mobile communicator 400. Furthermore, the insured information may be stored on or accessible using multiple mobile communicators 400, which may be carried by a single insured or by members of his family. It is appreciated that the system 402 may provide, via the insured's mobile communicator 400, contact details and directions to the insured as to preferred service providers and may additionally automatically make an appointment for treatment of the insured by a preferred service provider in the vicinity of the insured.

As shown in FIG. 4C, the insured receives appropriate medical treatment from a service provider, and either be or the service provider contacts the insurer, preferably using the insured's mobile communicator 400, to report details of the injury and of the medical facility where treatment is being received, and to request funding of the estimated or actual cost of the treatment. It is appreciated that this contact may be in the context of two-way data communication and need not involve an actual voice communication involving either or both the insured or a human representative of the insurer. In the context of this two-way data communication, the location of the insured may be ascertained manually by the insurer prompting the insured, or a third party, to enter the insured's location and/or automatically, utilizing GPS functionality of the insured's mobile communicator 402 or by cellular telephone location functionality of a cellular provider providing communication with the mobile communicator 402.

The insured may be prompted to provide personal credit card account details for a guarantee if the funding is found to be unjustified.

It is a particular feature of the present invention that self-executing insurance claim payment system 402 includes fraud detection functionality which is automatically operative to detect, with a high degree of certainty, fraudulent claims reported to the insurer. This detection may be achieved, for example, by voice analysis techniques, by statistical analysis or by cross checks employing, inter alia, the insured's medical history and insurance claim history which may be stored on the insured's mobile communicator or accessed thereby.

It is another particular feature of the present invention that for claims which system 402 determines, with a high degree of certainty, to be legitimate, system 402 is operative to automatically provide advance or real time funding of expected or actual medical expenses incurred by the insured under the coverage provided by the insurance policy, based on the reporting by the insured or the service provider of the medical expense incurred. Preferably, advance funding is automatically transferred by system 402 to credit card or debit card payment functionality of the insured's mobile communicator 400. Alternatively, the funding may be provided to the insured, for example, by crediting the insured's or the service provider's credit\debit card account, bank account, or any other personal banking or crediting system.

It is yet another particular feature of the present invention that the system 402 requires that credit card account details of the insured be provided to serve as a guarantee to be invoked by the system 402 to reimburse the insurer in a case where the insured has received from the insurer compensation for fraudulent or unjustified insurance claims, notwithstanding activation of the fraud detection functionality.

It is appreciated that system 402 comprises a knowledge base which facilitates calculation of expected medical expenses, which knowledge base includes accumulated statistics of cost of treatment of a wide range of medical treatments provided in any of a wide range of locales and medical institutions around the world.

Returning now to FIG. 4C, it is seen that upon determining, with a sufficiently high degree of certainty, that the insured's claim is legitimate, funding is preferably provided to the insured via the credit card or debit card payment functionality of insured's mobile communicator 400. As seen in FIG. 4C, the credit card or debit card payment functionality of insured's mobile communicator 400 is credited with $500, which is the expected cost of the insured's medical expense as estimated by system 402.

Upon checking out of the hospital, the insured is charged $435 for the actual cost of the medical treatment he received at the hospital, which the insured pays using the credit card or debit card payment functionality of insured's mobile communicator 400. It is appreciated that the actual charge of $435 is less than the $500 credited to credit card or debit card payment functionality of insured's mobile communicator 400.

Alternatively, as shown in FIG. 4D, the insured defers contacting the insurer until after completing the medical treatment and after paying $435 to the hospital. Payment may be achieved, for example, by charging the credit card or debit card payment functionality of insured's mobile communicator 400. After checking out of the hospital, the insured contacts the insurer, preferably via the insured's mobile communicator 400, to report the injury and to request reimbursement for the cost of the treatment. It is appreciated that this contact may be in the context of two-way data communication and need not involve an actual voice communication involving either or both the insured or a human representative of the insurer. Upon determining with a high degree of certainty that the insured's claim is not fraudulent or unjustified, and optionally upon obtaining a guarantee in the form of the insured's personal credit card account details, reimbursement is preferably provided to the insured via the credit card or debit card payment functionality of insured's mobile communicator 400, the insured's personal credit card, personal debit card, or to the insured's bank account.

Figure 4E:
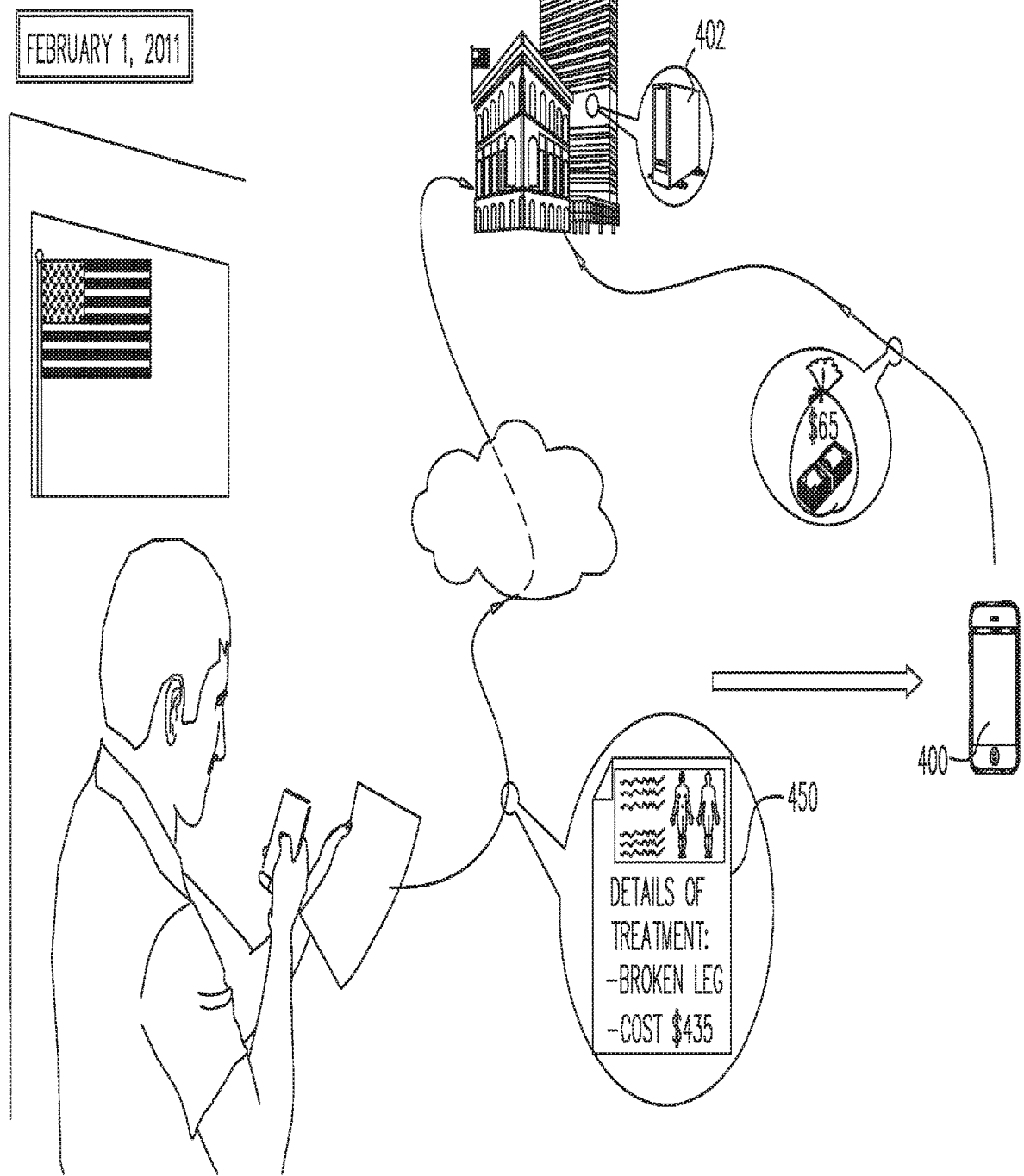

Turning now to FIG. 4E, it is shown that upon returning from abroad, such as on February 1, the insured may provide documentation 450 to the insurer regarding medical treatment provided and any related costs incurred during the insured's trip abroad. This is preferably done using a camera or scanning functionality of the insured's mobile communicator 400. Upon receiving documentation 450 and the treatment and its cost of $435 from the insured, self-executing insurance claim payment system 402 collects any difference between sums previously forwarded to the insured and the actual justified cost of the treatment as determined by the insurer, from the credit card or debit card payment functionality of insured's mobile communicator 400. In the scenario of FIG. 4C this difference is $65, which is the difference between the $500 originally forwarded to the insured and the $435 which the insured actually paid for the treatment.

Figure 4F:
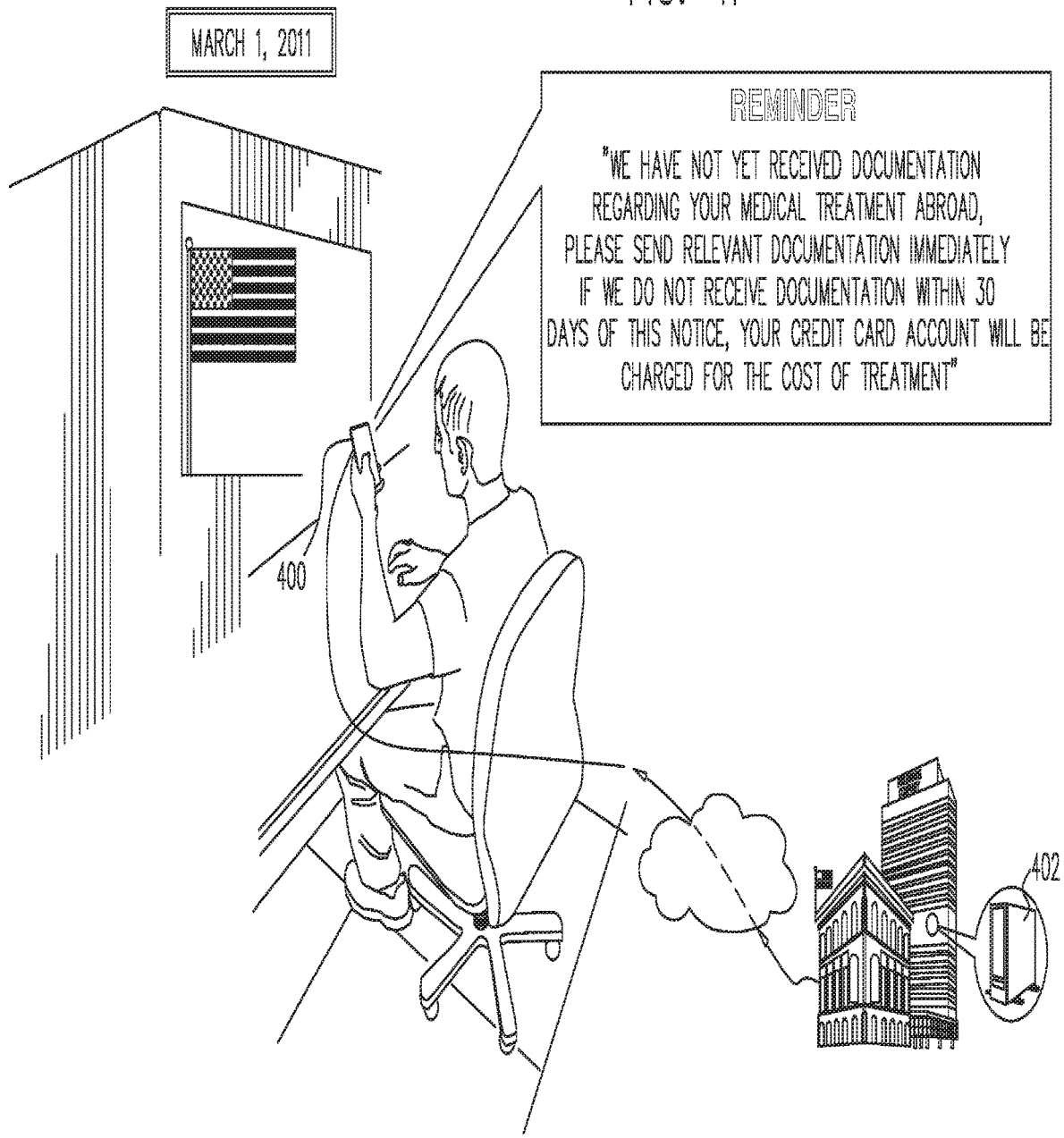

Alternatively, as shown in FIG. 4F, should the insured fail to provide requested documentation within a reasonable amount of time, such as by March 1, self-executing insurance claim payment system 402 sends the insured a reminder, preferably to the insured's mobile communicator 400, to provide the documentation, warning him that failure to do so will result in the insurer invoking the credit card account guarantee provided by the insured, as described hereinabove with regard to FIGS. 4C & 4D.

Figure 4G:
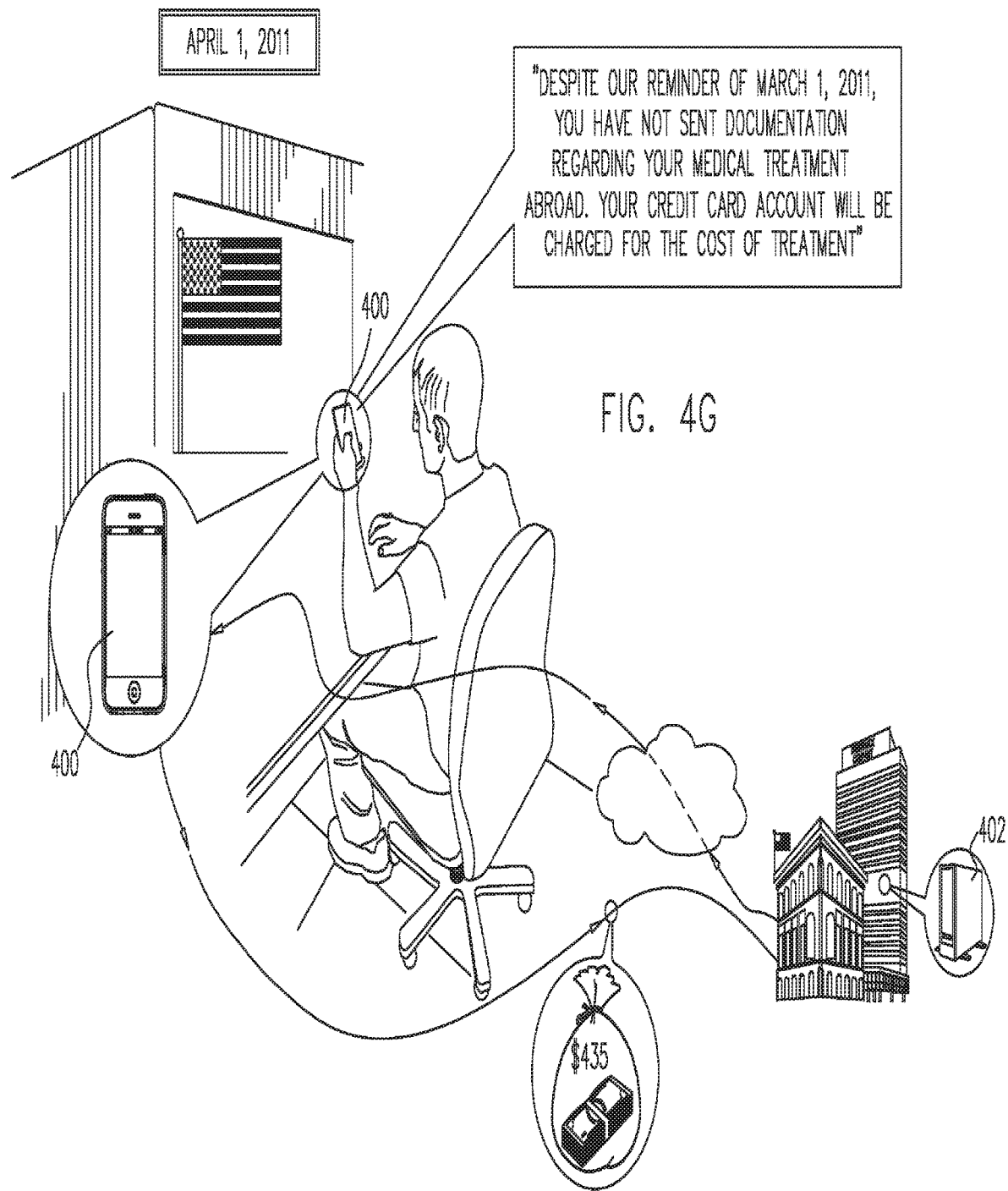

As shown in FIG. 4G, should the insured fail to provide relevant documentation by April 1, despite the warning sent by the insurer, self-executing insurance claim payment system 402 invokes the guarantee provided and charges the insured's credit card account for the total amount previously provided to the insured. In FIG. 4G, this amount is shown as $435, which was actually paid in the scenario of FIG. 4D.

It is appreciated that all of the foregoing may be achieved without there taking place any human voice telephone conversation involving either the insured or a representative of the insurer. It is further appreciated that at any suitable stage, either the insured or the insurer may elect to initiate a personal human to human telephone interaction, preferably using the insured's mobile communicator 400.

It is additional appreciated that mobile communicators which have been specifically programmed with applications to carry out the foregoing functionalities may be provided to insured persons, who can use them instead of or in addition to their own mobile communicators for some or all of the above-described functions.

Additionally, the system 402 may provide automatic warnings to the insured or to other appropriate parties regarding overuse of certain medicines or the use of dangerous combinations at medicines, as well as reminders to update or refresh prescriptions.

It is appreciated that the system and methodology described hereinabove with reference to FIGS. 2A-2F may also be modified to employ a mobile communicator in the manner generally described hereinabove with reference to FIGS. 4A-4G.

Figure 5:
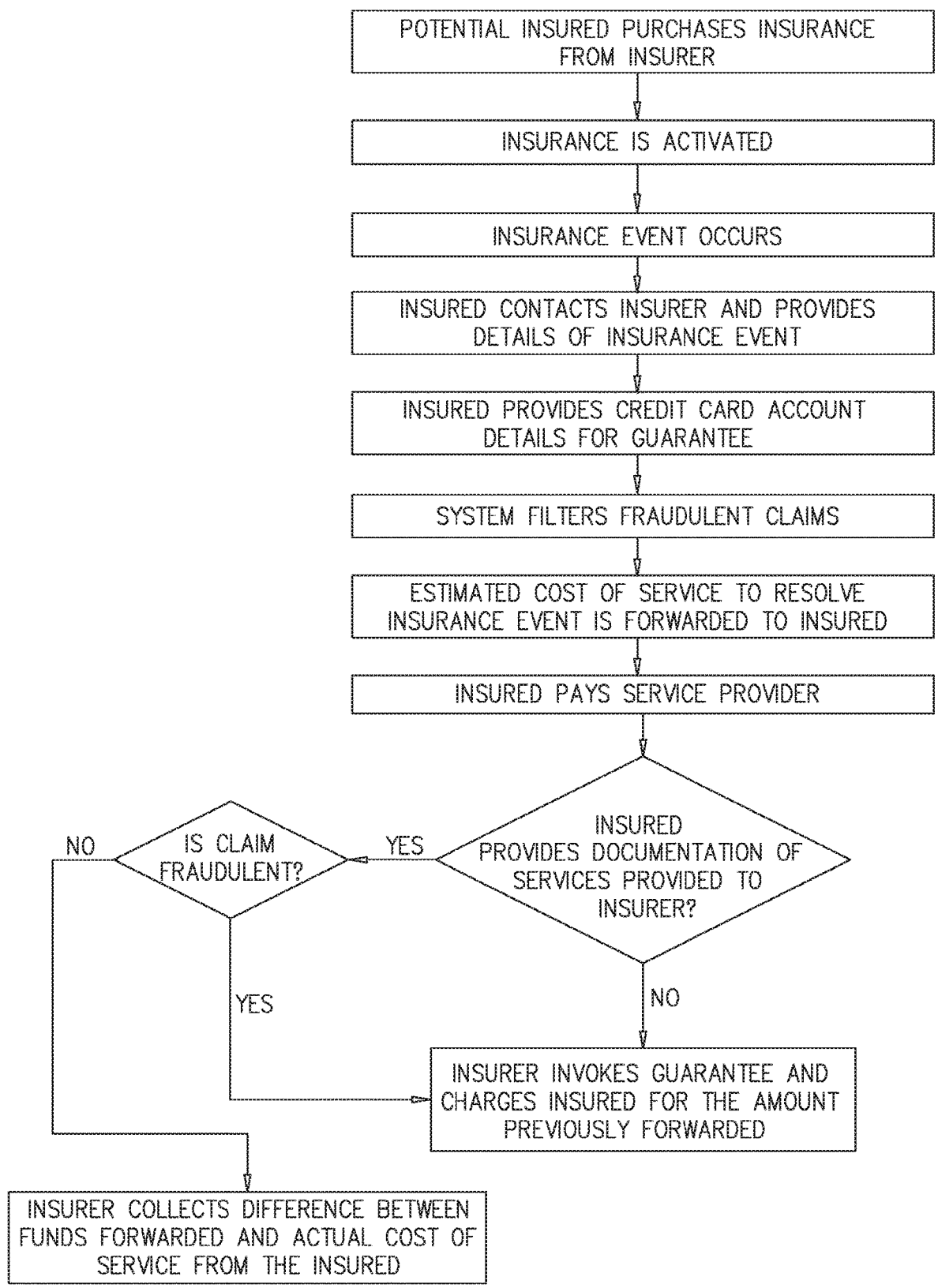
FIG. 5 is a simplified flow chart illustrating one example of the operation of the system of FIGS. 4A-4G.

Reference is now made to FIG. 5, which is a simplified flow chart illustrating one example of the operation of the system of FIGS. 4A-4G. As shown in FIG. 5, a potential purchaser of insurance purchases insurance from an insurer, which insurance is then activated by the insurer. All of the foregoing is preferably achieved via data communication between a potential purchaser's computer, most preferably his mobile communicator, and a server of the insurer, without real time human intervention on the part of the insurer.

As discussed hereinabove with reference to FIG. 4A, to purchase the insurance the purchaser typically provides some or all of the following:

Personal information, such as name, address, age or date of birth and passport number;

Personal medical information, such as medications and allergies to medications;

Credit card account information to charge the cost of the insurance and any disbursements/reimbursements related to the insurance policy;

Travel information, such as dates of travel and destinations;

Permission to access medical history; and

Permission for the mobile communication service provider to provide country of origin information to the insurer.

As discussed hereinabove with reference to FIG. 4B, the purchased insurance policy is typically activated either automatically when the insured reaches a departure port or at a predetermined date and time.

After the occurrence of an insured event which is covered by the insurance, the insured contacts the insurer, typically utilizing the insured's mobile communicator 400, and provides details of the insured event and provides personal credit card account details for guarantee. All of the foregoing is preferably achieved via data communication between a potential purchaser's computer, most preferably his mobile communicator, and a server of the insurer, without real time human intervention on the part of the insurer. An insured event may be any event which the resolution thereof is covered under the terms of the purchased insurance.

The system, upon ascertaining with a sufficiently high degree of certainty that the insured's claim is not fraudulent, forwards the estimated or actual incurred cost of resolving the insured event to the insured, preferably using the insured's mobile communicator 400. The insured uses the forwarded funds to pay a service provider for services received to resolve the insured event. Upon the insured providing documentation and details of the cost of services provided to the insured, the insurer utilizes the documentation to ascertain that the insured's claim is legitimate and not fraudulent. The insurer then collects the difference between the sum previously forwarded to the insured's credit card account and the actual cost of service as paid by the insured, from the insured's credit card account. If the insured does not provide relevant documentation within a reasonable timeframe, or if the documentation is not sufficient to prove the legitimacy of the insured's claim, the insurer invokes the guarantee and charges the insured's credit card account for the amount previously forwarded.

Reference is now made to FIGS. 6A, 6B, 6C, 6D, 6E, 6F, 6G, 6H and 6I, which are simplified pictorial illustrations of steps in reimbursement interactions employing the system and methodology of another preferred embodiment of the present invention. The system of FIGS. 6A-6I is a computerized reimbursement system composing reimbursement authorization functionality for issuing or activating, by a reimbursing party, such as an employer, a reimbursement-enabled mobile communicator to be carried by a person authorized to receive reimbursement, such as an employee about to leave on a business trip. The computerized reimbursement system preferably includes a charge back provision allowing the reimbursing party to charge back the authorized user for the cost of unauthorized payments made using the reimbursement-enabled mobile communicator.

The system also comprises automatic reimbursement verification functionality which is operative to automatically verify the right of the authorized user or other payee to receive payment from the reimbursing party by automatically verifying at least one of the location of the payee, the entitlement of the authorized user to purchase products or services based, inter alia, on parameters of a reimbursement policy of the reimbursing party, which are stored on the reimbursement-enabled mobile communicator or accessible using the reimbursement-enabled mobile communicator, and the value of the payment to be made.

The system preferably also comprises reimbursement documentation requesting functionality operative to request from the authorized user, at the initiative of the reimbursing party, prior to or following payment, documentation relating to a payment, and chargeback functionality operative to charge back to the authorized user, at the initiative of the reimbursing party, in the absence of receipt of acceptable documentation or under other appropriate circumstances, at least part of the payment.

As shown in FIG. 6A, prior to traveling on a business trip, such as on Jan. 1, 2011, an employer representative may provide a reimbursement-enabled mobile communicator 600 to an authorized user such as an employee about to go on a business trip.

Alternatively, the employer representative may enable a mobile communicator of the authorized user to be enabled for reimbursement by the computerized reimbursement system, such as by downloading a suitable application to the mobile communicator of the authorized user. In this alternative embodiment, the application preferably requests that the user grant permission for the mobile communication service provider to provide country of origin information to the computerized reimbursement system. Additionally or alternatively, country of origin information is provided to the computerized reimbursement system by product and service providers processing transactions utilizing reimbursement-enabled mobile communicator 600.

Additionally, reimbursement-enabled mobile communicator 600 may also include functionality to recommend preferred product and service providers and to provide travel directions thereto.

As seen in FIG. 6A, the reimbursing party, such as the employer, typically informs the authorized user typically the employee, of the reimbursement policy associated with the reimbursement-enabled mobile communicator 600.

Figure 6B:
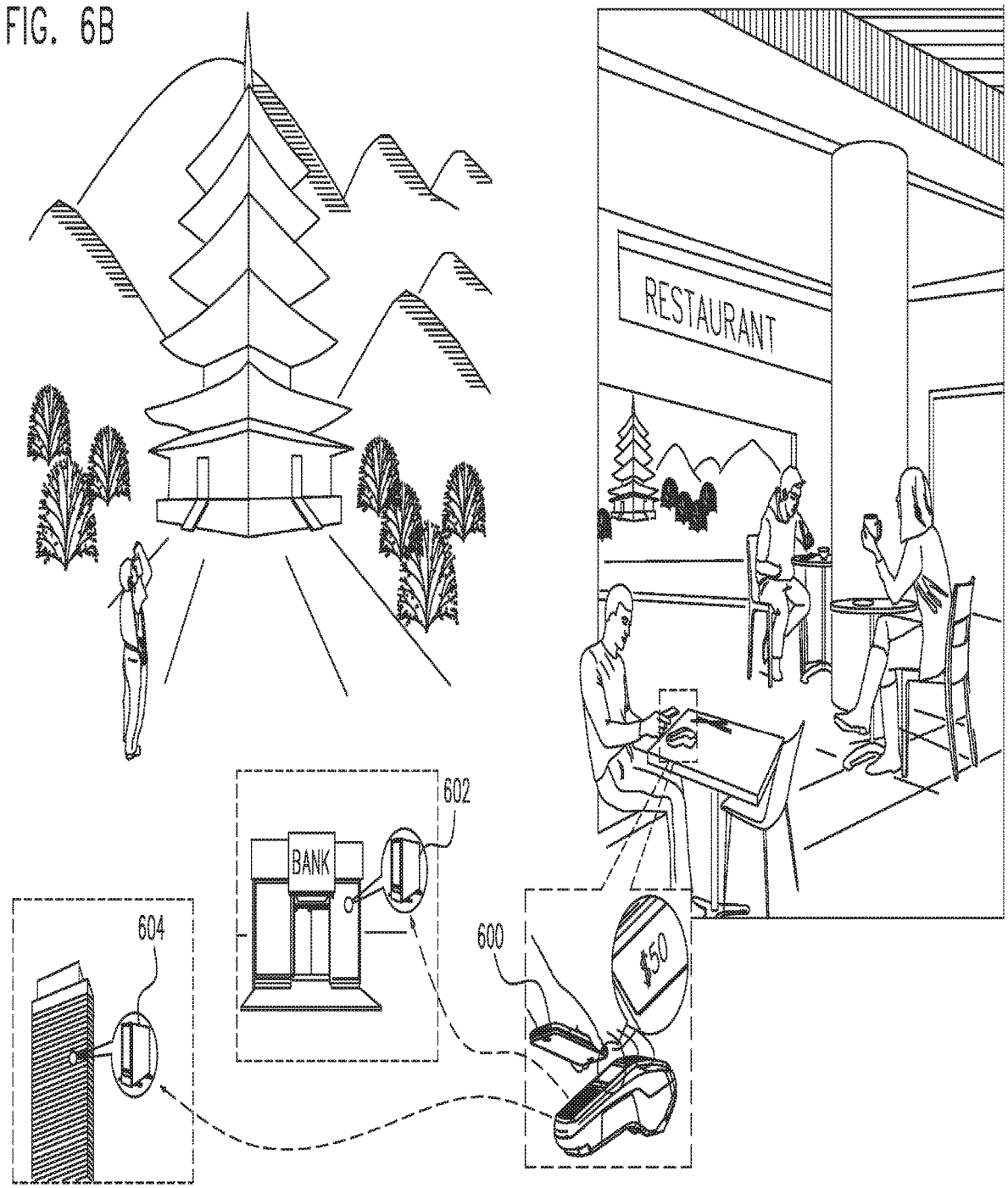

Turning now to FIG. 6B, it is shown that in the course of a business trip in Japan, the employee uses reimbursement-enabled mobile communicator 600 to pay a restaurant bill for $50, which does not exceed the restaurant expense maximum reimbursable amount of $50. The transaction is preferably completed in a conventional mariner via the cellular network and the internet with the employer's bank 602 and a server 604 on which the computerized reimbursement system resides.

Figure 6C:
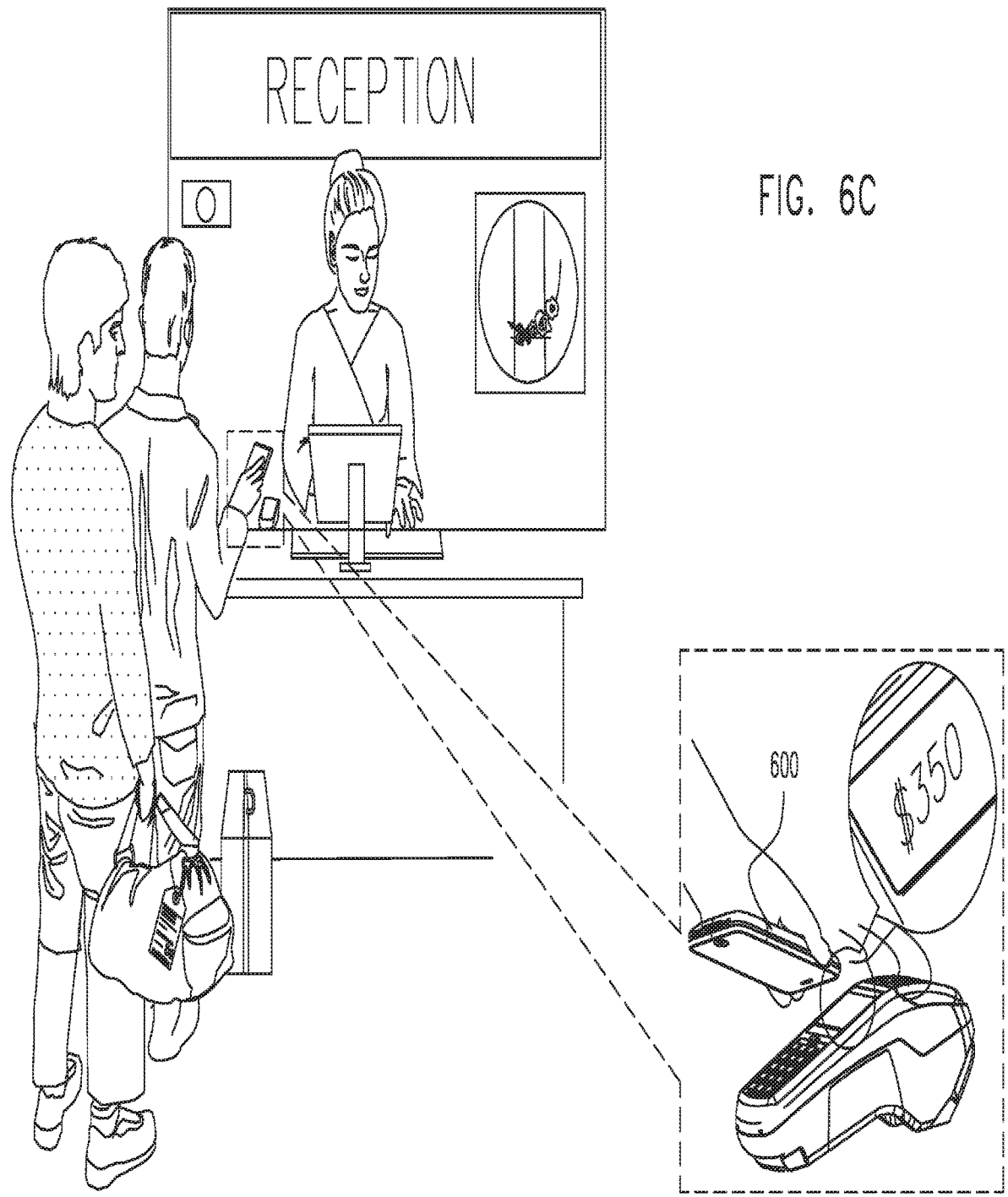

FIG. 6C shows a similar authorized transaction for payment of a hotel bill of $350, which does not exceed the hotel expense maximum reimbursable amount of $400.

FIG. 6D shows an unauthorized transaction, wherein the amount charged is less than a global maximum reimbursable amount, such as $500, but the type of transaction is not generally available. In this example, the payment nevertheless is made by the system, which is unable to ascertain that the transaction is unauthorized.

Figure 6E:
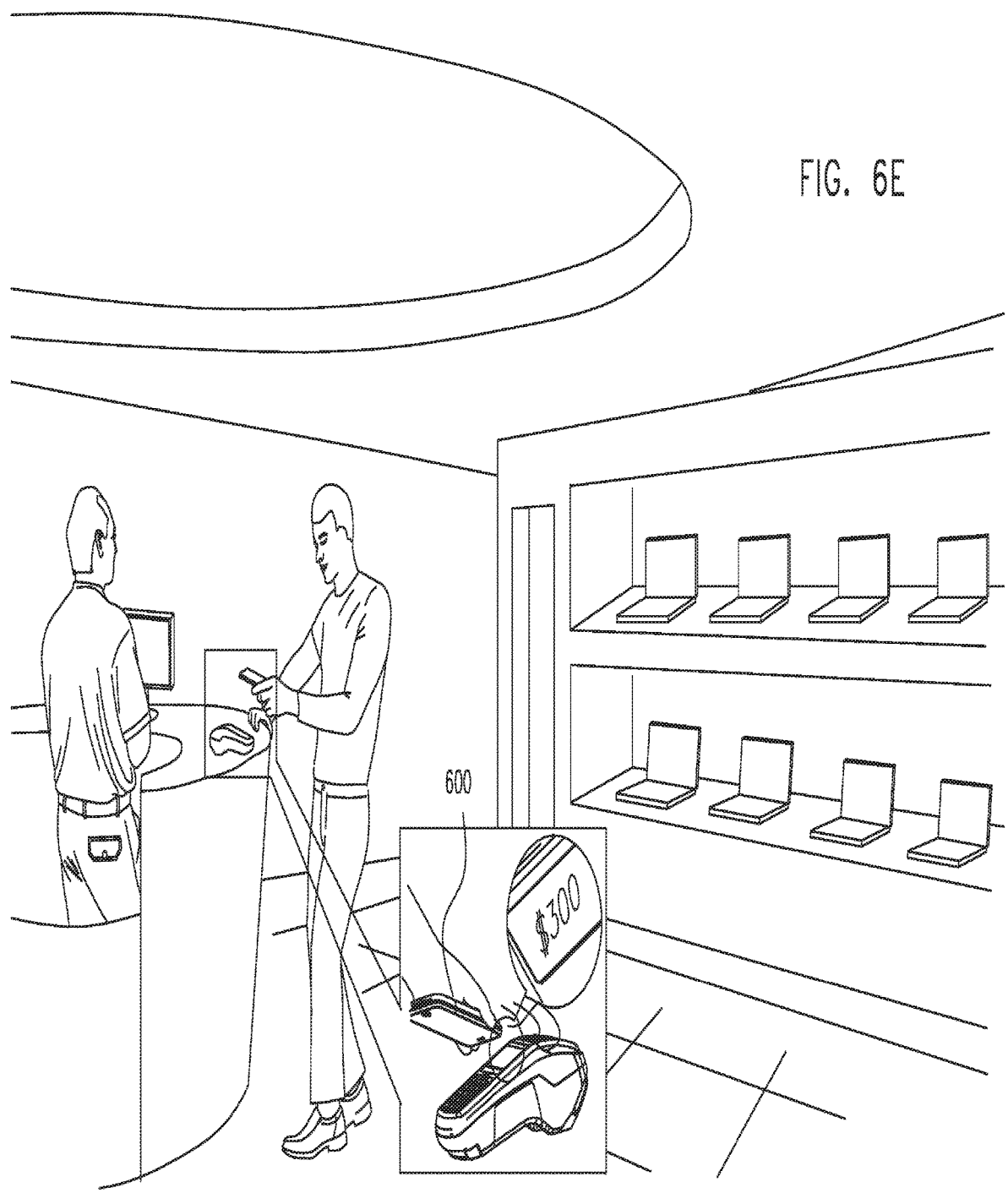

FIG. 6E shows another type of unauthorized transaction, wherein the amount of the payment exceeds a single transaction expense type maximum reimbursable amount for the type of purchase, such as a $200 limit on computer supplies, but is within a single transaction global maximum reimbursable amount, such as $500. In this example, the payment is made by the system.

FIG. 6F illustrates yet another type of unauthorized transaction, wherein the amount is greater than the single transaction global maximum reimbursable amount, such as $500, and the type of purchase is recognized as an unauthorized purchase. In this example, the payment is not made by the system.

Figure 6G:
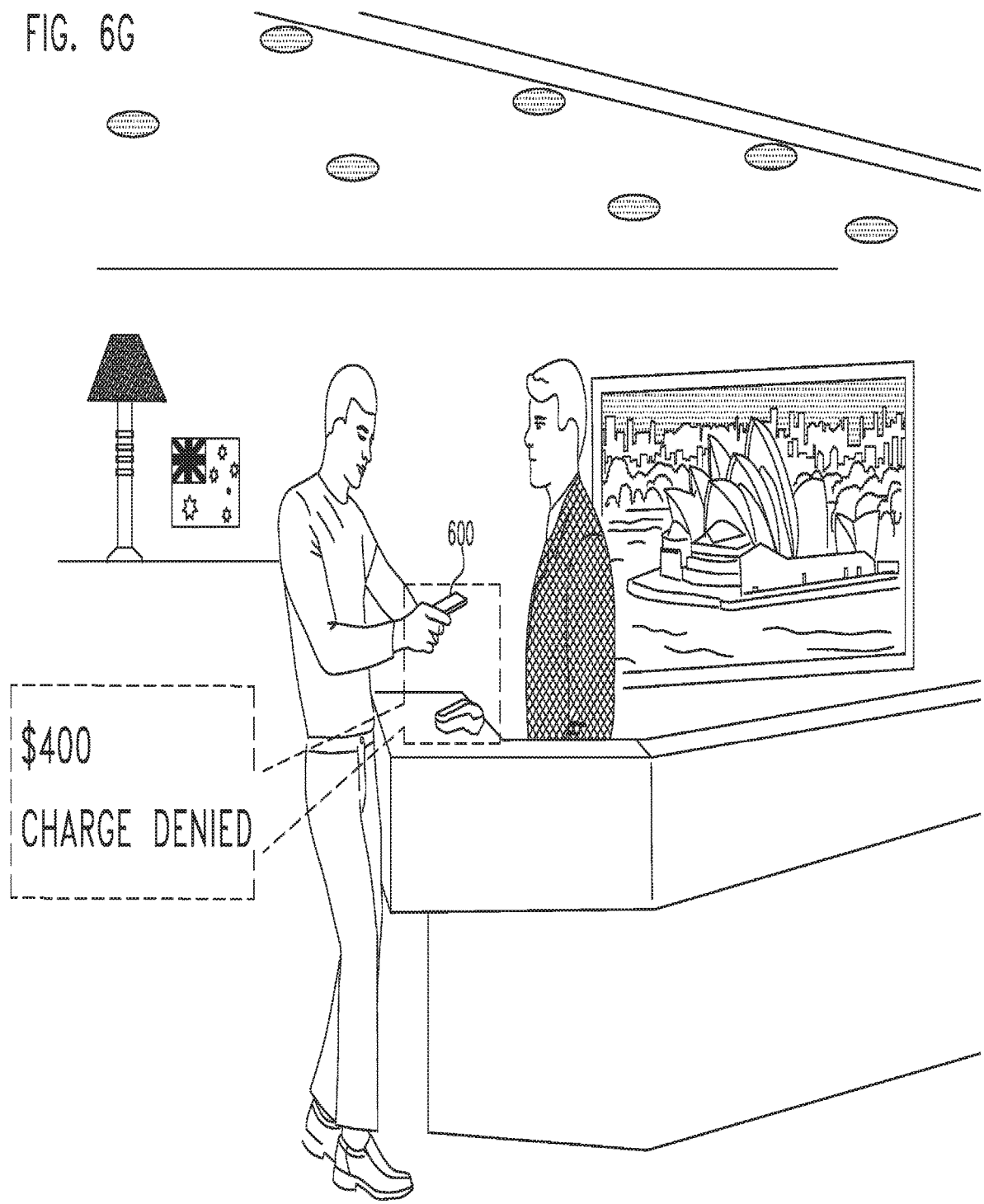

FIG. 6G illustrates yet another type of unauthorized transaction, wherein the amount charged is less than the expense type maximum reimbursable amount, but the charge is made in a location that is not an authorized location. In this example, the payment is not made by the system.

Figure 6H:
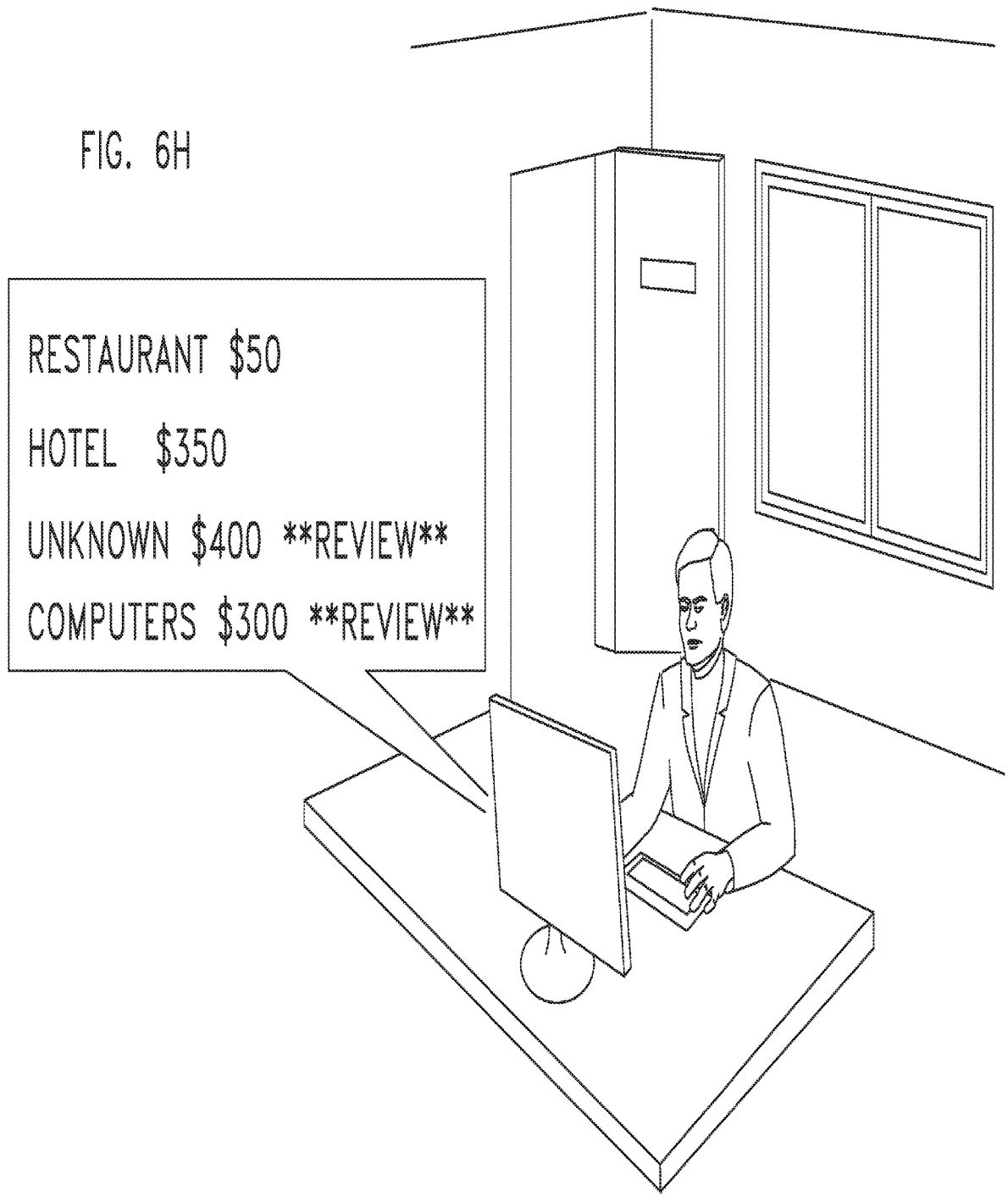
Figure 61:
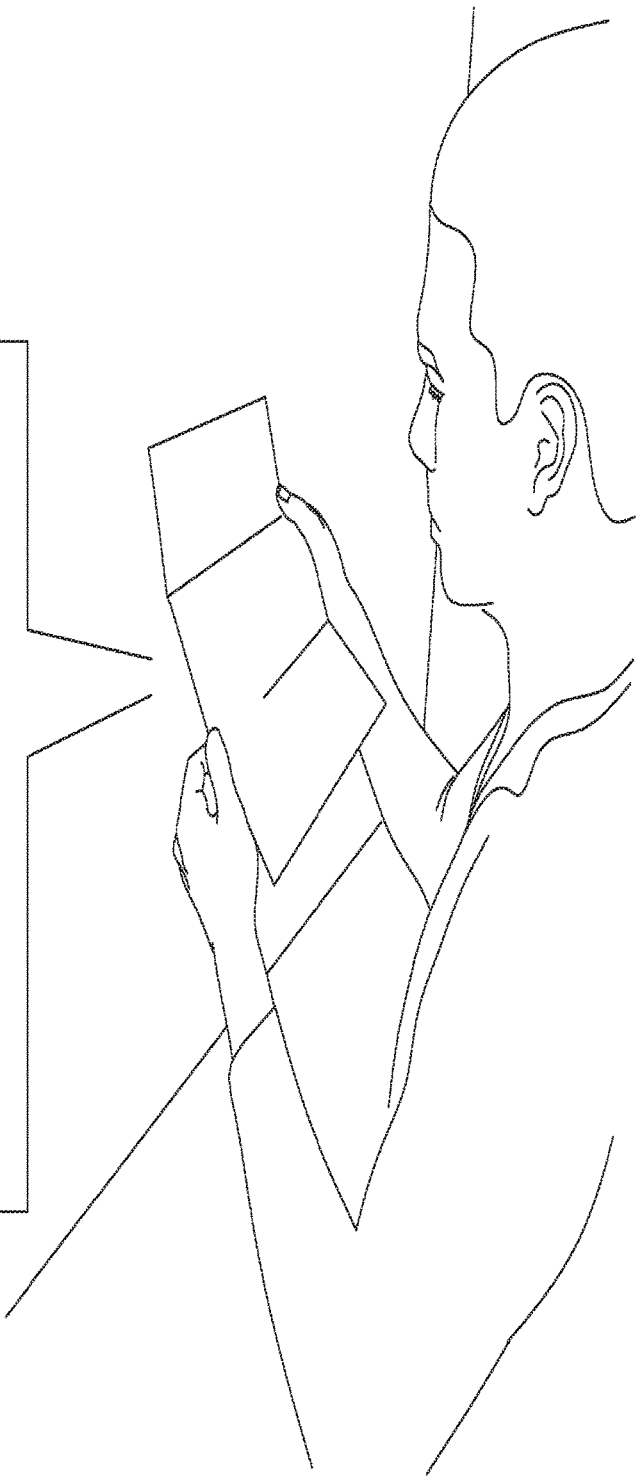

FIG. 6H illustrates a reimbursement review functionality of the computerized reimbursement system which may be operative, at the initiative of the reimbursing party, to provide to the reimbursing party an output, based on the reimbursement policy parameters, indicating questionable processed transactions that need to be reviewed, as seen in FIG. 6H. Thus, for example, for the transactions illustrated in FIGS. 6B and 6C, in which the type of transaction is authorized and the amount of the transaction does not exceed the single transaction expense type maximum reimbursable amount, no review is recommended, while for the transactions illustrated in FIG. 6D, in which the type of transaction is not generally available, and FIG. 6E, in which the amount of the transaction exceeds the single transaction expense type maximum reimbursable amount but does not exceed the single transaction global maximum reimbursable amount, the computerized reimbursement system may be operative to recommend review.

Upon review of the processed transactions, the reimbursing party may employ the computerized reimbursement system to charge back to the authorized user at least a portion of the payment. It is appreciated that when the authorized user is an employee of the reimbursing party, the charge back may be implemented by automatically deducting the at least a portion of the payment from the employee's wages, as seen in FIG. 6I.

Thus, in the illustrated example shown in FIG. 6I, the reimbursing party employs the computerized reimbursement system to charge back to the authorized user the entire amount of the unauthorized transaction illustrated in FIG. 6D, which charge back is implemented by automatically deducting the payment from the employee's wages.

Reference is now made to FIG. 7, which is a simplified flowchart of the operation of the system of FIGS. 6A-6I.

As seen in FIG. 7, a reimbursing party, such as an employer, activates a reimbursement-enabled mobile communicator by loading reimbursement policy parameters into the reimbursement-enabled mobile communicator. It is appreciated that reimbursement policy parameters may include, for example, a geographic location or locations, a type of reimbursable expense, a single transaction expense type maximum reimbursable amount, a single transaction global maximum reimbursable amount, a trip duration expense type maximum reimbursable amount and a trip duration global maximum reimbursable amount. It is appreciated that reimbursement policy parameters may include one or more of time dependent parameters, such as start date and duration of a specific business trip, location dependent parameters, employee dependent parameters and global parameters, or any combination thereof.

The reimbursing party, such as an employer, provides a reimbursement-enabled mobile communicator to an authorized user, such as an employee about to leave on a business trip.

The authorized user may then use the reimbursement-enabled mobile communicator to pay for products and/or services.

As seen in FIG. 7, when the reimbursement-enabled mobile communicator is presented to pay for products and/or services, the computerized reimbursement system is preferably operative, utilizing information received regarding the location, the type and the amount of the charge, to ascertain if the transaction is within the reimbursement policy parameters. Based on the information received regarding the transaction and the reimbursement policy parameters, the computerized reimbursement system is preferably operative to either process or not process the payment.

For example, as seen in FIGS. 6B and 6C, where the type of transaction is authorized and the amount of the transaction does not exceed the single transaction expense type maximum reimbursable amount, the system will generally process the payment.

For example, as seen in FIG. 6D, where the type of transaction is not generally available and the amount of the transaction does not exceed the single transaction global maximum reimbursable amount, the system will generally process the payment.

In another example, seen in FIG. 6E, where the type of transaction is authorized and the amount of the transaction exceeds the single transaction maximum expense type reimbursable amount but does not exceed the single transaction global maximum reimbursable amount, the system will generally process the payment.

In another example, seen in FIG. 6F, where the type of transaction is recognized as not authorized and/or the amount of the transaction exceeds the single transaction global maximum reimbursable amount, the system will generally not process the payment.

In another example, seen in FIG. 6G, where the location is not authorized, even if the type of transaction is authorized and the amount of the transaction does not exceed the single transaction expense type maximum reimbursable amount, the system will generally not process the payment.

As seen further in FIG. 7, the computerized reimbursement system is preferably operative to request documentation relating to a payment from the authorized user, prior to or following payment. It is appreciated that the computerized reimbursement system is further operative, in the absence of receipt of acceptable documentation or under other appropriate circumstances, such as using the reimbursement-enabled mobile communicator for an unauthorized payment, to charge back to the authorized user at least a portion of the payment.

It is appreciated that in the case where the authorized user is an employee, the charge back may be implemented by automatically deducting the at least a portion of the payment from the employee's wages, as seen further in FIG. 6I.

It is also appreciated that the computerized reimbursement system may be operative to provide to the reimbursing party an output, based on the reimbursement policy parameters, indicating questionable processed transactions that need to be reviewed, as seen in FIG. 6H. Thus, for example, for the transactions illustrated in FIGS. 6B and 6C, in which the type of transaction is authorized and the amount of the transaction does not exceed the single transaction expense type maximum reimbursable amount, no review is recommended, while for the transactions illustrated in FIG. 6D, in which the type of transaction is not generally available, and FIG. 6E, in which the amount of the transaction exceeds the single transaction expense type maximum reimbursable amount but does not exceed the single transaction global maximum reimbursable amount, the computerized reimbursement system may be operative to recommend review.

As seen further in FIG. 7, upon review of the processed transactions, the reimbursing party may employ the computerized reimbursement system to charge back to the authorized user at least a portion of the payment. Alternatively, the reimbursing party may decide to accept the transaction. It is appreciated that when the authorized user is an employee of the reimbursing party, the charge back may be implemented by automatically deducting the at least a portion of the payment from the employee's wages, as seen in FIG. 6I.

Thus, for example, for the transaction illustrated in FIG. 6D, in which the system generally will process the payment, upon review, the reimbursing party may realize that the payment was for an unauthorized type of use and employ the computerized reimbursement system to charge the authorized user for the entire amount of the payment. It is appreciated that in the case where the authorized user is an employee of the reimbursing party, the charge back may be implemented by automatically deducting the at least a portion of the payment from the employee's wages.

Similarly, for the transaction illustrated in FIG. 6E, in which the system generally will process the payment, upon review, the reimbursing party may realize that the payment was for an amount greater that the maximum authorized amount and employ the computerized reimbursement system to charge the authorized user for the amount of the payment greater than the maximum authorized amount. Alternatively, as seen in FIG. 7, upon review, the reimbursing party may decide to accept the payment and not charge the authorized user for the amount of the payment greater than the maximum authorized amount.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for providing remote automated payment of medical insurance payments associated with a medical insurance policy of a user, said system comprising:
   an insurance claim evaluation and payment authorization server communicating with mobile communicators over a network, said mobile communicators include first and second communication circuits and a processor executing instructions, said server comprises digital knowledgebase containing data, data network communication circuitry and processing circuitry, the system being configured to perform multiple actions including
   I) receiving a user generated request including an insurance claim, from a specific mobile communicator of the mobile communicators, said specific mobile communicator is operated by the user and the request is received over a distributed data network, for automated payment of a charge from a service provider,
   II) said specific mobile communicator
      (a) estimating a location of the specific mobile communicator by using an associated localization circuit,
      (b) receiving user input through a user interface of the specific mobile communicator,
      (c) wirelessly transmitting through said first communication circuits to said server,
         (i) the estimated location of the specific mobile communicator,
         (ii) description of an insurance event declared by the user,
         (iii) an identifier of the service provider engaged in addressing the insurance event, and
         (iv) a description of services,
      (d) wirelessly, through said first network, receiving information enabling automatic transfer of a charge amount to a service provider designated account, and
      (e) causing the communication circuitry to convey the received information to a funds transfer terminal selected by the service provider,
   III) communicating with said mobile communicators and receiving from said specific mobile communicator individual requests for automated remote payment of an insurance claim with,
      (a) user declared description of the insurance event,
      (b) location and identification of the service provider,
      (c) user declared description of description of services, and
      (d) the estimated location of the specific mobile communicator estimated by the specific mobile communicator,
   IV) estimating costs of the services provided to the user based on service type and the estimated location of the specific mobile communicator, and
   V) executing a set of instructions for each of the individual requests for automated claim payment, said instructions including
      a. identifying that the individual request was received from the specific mobile communicator associated with an insured party entitled to request automated claim payment,
      b. identifying the location of the service provider matches the estimated location of the specific mobile communicator, and
      c. based on the data contained in said digital knowledgebase, checking that the requested claim charge amount is within a range for services provided to the user and in the context of the insurance event and location of the service provider,
   wherein, upon verifying a group of parameters of the claim, said server automatically authorizing payment of the claimed charge amount through an automated payment interface to make available funds in the service provider's designated account.

2. The system according to claim 1, wherein said server for receiving locational data relating to the mobile communicators are configured to receive the locational data from electronic positioning components of the mobile communicators; or (b) from data received from mobile communication providers.

3. The system according to claim 1, wherein said server is further configured to automatically detect fraudulent requests for automated remote payment based on analysis of data within said database.

4. The system according to claim 1, wherein said digital knowledgebase includes accumulated statistics of cost of insurance events provided in locales and by service providers around the world.

5. A system for providing remote automated payment of medical insurance payments associated with an insurance policy of a user, said system comprising:
   an insurance claim evaluation and payment authorization server to receive a user generated request including an insurance claim, from a mobile communicator of the user and over a distributed data network, for automated payment of a charge from a service provider and the mobile communicator, the system being configured to perform multiple actions including I) sending electronic communications from the mobile communicator, wherein said mobile communicator including first and second communication circuits and a processor executing instructions adapted to,
  (a) estimate a location of the mobile communicator by using an associated localization circuits,
  (b) receive user input through a user interface of the mobile communicator,
  (c) wirelessly transmit through said first communication circuits to said server,
    (i) the estimated location of the mobile communicator,
    (ii) description of an insurance event declared by the user,
    (iii) an identifier of the service provider engaged in addressing the insurance event,
  (d) wirelessly, through said first network, receive information enabling automatic transfer of the charge amount to a service provider designated account, and
  (e) cause the communication circuitry to convey the received information to a funds transfer terminal selected by the service provider,
II) receiving electronic communications from the mobile communicator, including individual requests for automated remote payment of insured payments, each individual request including: (a) a charge amount and description of services provided by the service provider; (b) description of insurance event declared by the user; (c) an identifier of the service provider engaged in addressing the insurance event; (d) and a location of the mobile communicator,
III) using a digital knowledgebase containing data for estimating costs of the service related insured payments based on treatment type and location,
IV) using the server to execute a set of instructions for each of the individual requests for automated claim payment, that,
  the individual request was received from the mobile communicator associated with an insured party entitled to request automated claim payment,
  the location of the treatment matches the estimated location of the mobile communicator, and
  based on the data contained in said digital knowledgebase, the amount of the requested claim charge amount is within a range for services provided to the user and in the context of the insurance event and location of the service provider,
  wherein, upon verifying a group of parameters of the claim, said server automatically authorizes payment of the claimed charge amount through an automated payment interface to make available funds to the service provider's designated account by presenting fund transfer enabling information, which fund transfer enabling information is sent to the mobile communicator; and
V) advancing funds, using an insurance claim evaluation and payment authorization server, to the service provider's designated account associated with the mobile communicator, upon authorization of the individual request.

6. The system according to claim 5, further comprising causing each individual mobile communicator to store within data storage of the individual mobile communicator a link to medical records relating to an individual insured party associated with the individual mobile communicator.

7. The system according to claim 5, further comprising causing each of the mobile communicators to provide travel directions to medical service providers.

8. The system according to claim 5, wherein receiving locational data relating to the mobile communicators includes receiving locational data from electronic positioning components of the mobile communicators.

9. The system according to claim 5, further comprising automatically detecting fraudulent requests for automated remote payment based on analysis of data within said database.

10. The system according to claim 5, wherein said digital knowledgebase includes accumulated statistics of cost of insurance related services provided in locales and by service providers around the world.

\* \* \* \* \*